US008171052B2

(12) United States Patent
Takuma et al.

(10) Patent No.: US 8,171,052 B2
(45) Date of Patent: May 1, 2012

(54) INFORMATION SEARCH SYSTEM, METHOD AND PROGRAM

(75) Inventors: Daisuke Takuma, Sagamihara (JP); Yuta Tsuboi, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 430 days.

(21) Appl. No.: 12/396,876

(22) Filed: Mar. 3, 2009

(65) Prior Publication Data

US 2009/0222407 A1      Sep. 3, 2009

(30) Foreign Application Priority Data

Mar. 3, 2008   (JP) ................... 2008-051871

(51) Int. Cl.
*G06F 7/00* (2006.01)

(52) U.S. Cl. ...................................................... 707/786
(58) Field of Classification Search ........................ None
See application file for complete search history.

(56) References Cited

U.S. PATENT DOCUMENTS

2006/0253410 A1* 11/2006 Nayak et al. .................. 707/1
2007/0185845 A1*  8/2007 Nonomura .................... 707/3

FOREIGN PATENT DOCUMENTS

| JP | 2001134575 | 5/2001 |
| JP | 2002318798 | 10/2002 |
| JP | 2007317139 | 12/2007 |

OTHER PUBLICATIONS

Brian F. Cooper, Neal Sample, Michael J. Franklin, Gisli R. Hjaltason, Moshoe Shasmon, "A Fast Index for Semistructured Data", The VLDB Conference 2001.
Mohammed J. Zaki, "Efficiently Mining Frequent Trees in a Forest", 8th ACM SIGKDD international conference on Knowledge discovery and data mining, Jul. 23-26, 2002.
Hiroshi Kanayama, Kentaroh Torisawa, Yutaka Mitsuishi, Junichi Tsujii, "Dependency parsing model selecting a dependent from more than two candidates" Natural Language Processi.

* cited by examiner

*Primary Examiner* — Truong Vo
(74) *Attorney, Agent, or Firm* — Vazken Alexanian

(57) ABSTRACT

A system, method and computer program product for searching at high speed for documents matching a dependency pattern from document data containing a large volume of text documents. The system includes a storage device for storing, index storage means for storing in the storage device occurrence information, receiving means for receiving information, reading means for reading from the index storage means, and searching means for comparing occurrence information. The method and computer program product include the steps of storing in the storage device, receiving information, reading from the storage device, comparing occurrence information, and searching. The computer program product includes instructions to execute the steps of storing each of the plurality of document data in the storage device, storing in the storage device occurrence information.

15 Claims, 24 Drawing Sheets

(a)

(b)

INFORMATION SEARCH SYSTEM, METHOD AND PROGRAM

CROSS REFERENCE TO RELATED APPLICATION

This application claims priority under 35 U.S.C. §119 from Japanese Patent Application No. 200851871 filed Mar. 3, 2008, the entire contents of which are incorporated herein by reference.

BACKGROUND OF THE INVENTION

1. Field of the Invention

The present invention relates to a system, method and program for searching for a text matching a predetermined pattern from text data.

2. Description of the Related Art

There is a demand in technology of searching for a text matching a predetermined pattern from text data. Specifically, texts matching a given pattern are searched and problem analysis is performed on the found texts. There is also a similar demand for compliance violation analysis.

Taking interactions at a call center as an example, one of the conceivable tasks is carried out for a mistake that "Chumon to chigau seihin ga todoita (The product different from the one ordered has arrived)." In this task, a search pattern is created corresponding to the content of the mistake, and then documents of interactions are searched based on the search pattern to track a change in the number of searched-out documents before and after a measure for the mistake was taken. The task for such a purpose requires such high accuracy that the texts of the interactions first need to be parsed through language processing and then processed through pattern matching.

In this case, for example, it is considered to obtain documents matching the following pattern.

"chigau (different)" modifies "seihin (product)"
"seihin (product)" modifies "todoku (arrive)"

The parsing result has a tree structure called a parse tree expressing a dependency structure between words for each sentence. Moreover, a pattern to match nodes in the parse tree is also expressed by a tree structure. As a result, matching is a problem of determining whether or not the parse tree includes the pattern as a partial structure of parent and child nodes having a gap within an allowable range.

In Omnifind Analytics Edition provided by International Business Machines Corporation, a pattern is previously described and pattern matching is performed for all documents in batch processing.

However, the pattern description in the above case has the following problems.
1. Pattern creation involves trial and error, and sequential processing is needed from pattern editing to result browsing. Thus, efficiency is poor. Particularly, when a data size is large, one may have to wait for one day or more until the one can start to check a result of editing.
2. It is impossible to know what kind of pattern exists unless the entire text data is checked.
3. There is no clue to finding an unknown pattern in searching for a pattern useful for tasks.

In terms of searching on the tree structure, as a search technology for XPath, there is a technology described in "A Fast Index for Semistructured Data" (Brian F. Cooper, Neal Sample, Michael J. Franklin, Gisli R. Hjaltason, Moshoe Shasmon, The VLDB Conference 2001). In this technique, a table having a preorder and a postorder of each node is prepared in a relational database (RDB), and each node is handled as one record therein. By applying this technology to the parsing result, the above problem 1 can be solved. However, it takes several seconds to search through data of 100 MB for simple dependency including two words. Moreover, searching through data of several to several tens of GB takes such a long time that a user feels stress. Meanwhile, no solutions can be provided for the above problems 2 and 3.

For heuristic listing of patterns, there has been known a technology described in the document "Efficiently Mining Frequent Trees in a Forest" (Mohammed J. Zaki, Proceedings of the eighth ACM SIGKDD International Conference on Knowledge Discovery and Data Mining, Jul. 23-26, 2002) related to tree mining. This technology enables extraction of an embedded sub-tree (sub-tree including parent and child nodes not having a direct parent-child relationship in an original tree), which frequently appears by batch processing. However, when this technology is applied to the parsing result, a large amount of patterns obvious to a user are extracted, such as "onegai" "itasu" and "denwa (telephone)" "wo" "kiru (hang up)". The technology does not serve as a solution to the above problem 3.

"A Dependency Analysis Model with Choice Restricted to at Most Three Modification Candidates" (Hiroshi Kanayama, Kentaro Torisawa, Yutaka Mitsuishi and Jun-ichi Tsujii, Journal of Natural Language Processing, vol. 7, No. 5, pp. 71-91, 2000) proposes a triplet/quadruplet model in which: the conditional part of the probability consists of information on a modifier clause and all its modification candidates; and the probability that a candidate is chosen as the modifiee is calculated.

Japanese Patent Application Publication No. 2007317139 discloses supporting document data analysis by focusing on a relationship between dependencies. A dependency search condition input part specifies a dependency to be retrieved. In a normal search, a keyword and its search position (a modifier part or a modifiee part or both) are specified. A dependency search part extracts the dependency corresponding to the specified keyword and search position, by referring to a basic meaning chunk set storage part in a dependency set storage part. The dependency search part extracts a dependency of a modifier part or a modifiee part by referring to a meta-meaning chunk storage part in the dependency set storage part. Moreover, a display part displays a dependency set as a search result.

SUMMARY OF THE INVENTION

The present invention provides a technique of searching at high speed for documents matching a dependency pattern from document data containing a large volume of text documents.

According to an aspect of the present invention, an information search system for searching through a database having a plurality of document data each having a unique document ID added thereto is provided. The system includes a storage device for storing, index storage means for storing in the storage device occurrence information, receiving means for receiving information, reading means for reading from the index storage means, and searching means for comparing occurrence information.

According to a further aspect of the present invention, an information search method and computer program product for searching through a database having a plurality of document data each having a unique document ID added thereto are provided. The method and computer program product include the steps of storing in the storage device, receiving information, reading from the storage device, comparing occurrence information, and searching.

According to a still further aspect of the present invention, an index creation method and computer program product for searching through a database having a plurality of document data each having a unique document ID added thereto are provided. The method and computer program product include the steps of storing each of the plurality of document data in the storage device, storing in the storage device occurrence information.

DETAILED DESCRIPTION OF THE PREFERRED EMBODIMENT

Figure 1:
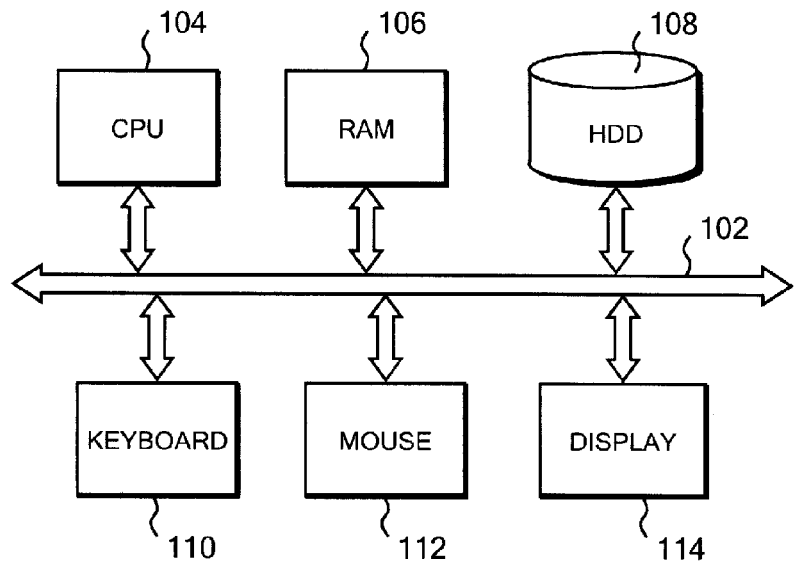
FIG. 1 is a schematic block diagram of hardware for implementing the present invention.

With reference to the drawings, a configuration and processing according to an embodiment of the present invention will be described below. In the following description, unless otherwise noted, the same components are denoted by the same reference numerals throughout the drawings. Note that it should be understood that the configuration and processing here will be described as one embodiment and there is no intention to limit the technical scope of the present invention to this specific embodiment.

FIG. 1 shows a block diagram of computer hardware for performing a system configuration and processing according to the embodiment of the present invention. In FIG. 1, a CPU 104, a main memory (RAM) 106, a hard disk drive (HDD) 108, a keyboard 110, a mouse 112 and a display 114 are connected to a system bus 102. The CPU 104 is preferably based on a 32-bit or 64-bit architecture; a Pentium™ 4 and Core™ 2 DUO by Intel Corporation or Athlon™ by AMD, Inc. can be used, for example. The main memory 106 preferably has a capacity of 2 GB or more. The hard disk drive 108 preferably has a capacity of 200 GB or more for storing text files obtained from a call center, for example, and index files for results of parsing thereof.

Although not individually shown, the hard disk drive 108 previously stores an operating system, the text files obtained, a program for parsing, and a program for the processing according to the present invention. Preferably, the hard disk drive 108 further stores index files generated as a result of the processing according to the present invention.

The operating system may be an arbitrary one compatible with the CPU 104, such as Linux™, Windows™ Vista, Windows XP™ and Windows™ 2000 by Microsoft Corporation, and Mac OS™ by Apple Computer.

Moreover, the hard disk drive 108 may also store an arbitrary programming language processor such as C, C++, C# and Java™. This programming language processor is used to create and retain a processing program according to the present invention.

The hard disk drive 108 may further include a text editor for writing source codes to be compiled by the programming language processor and a development environment such as Eclipse™.

The keyboard 110 and the mouse 112 are used to launch a program (not shown), which is loaded into the main memory 106 from the operating system or the hard disk drive 108 and displayed on the display 114, and also used to type characters.

The display 114 is preferably a liquid crystal display, and a display having an arbitrary resolution, such as XGA (1024×768 resolution) and UXGA (1600×1200 resolution), can be used. Although not shown, the display 114 is used to display an operation screen for an index creation tool, a search tool and the like according to the present invention. Specifically, on the screen, a predetermined parameter or a file name is entered through the keyboard 110 and a predetermined button displayed is clicked with the mouse 112. Thus, keyword creation processing is started.

Figure 2:
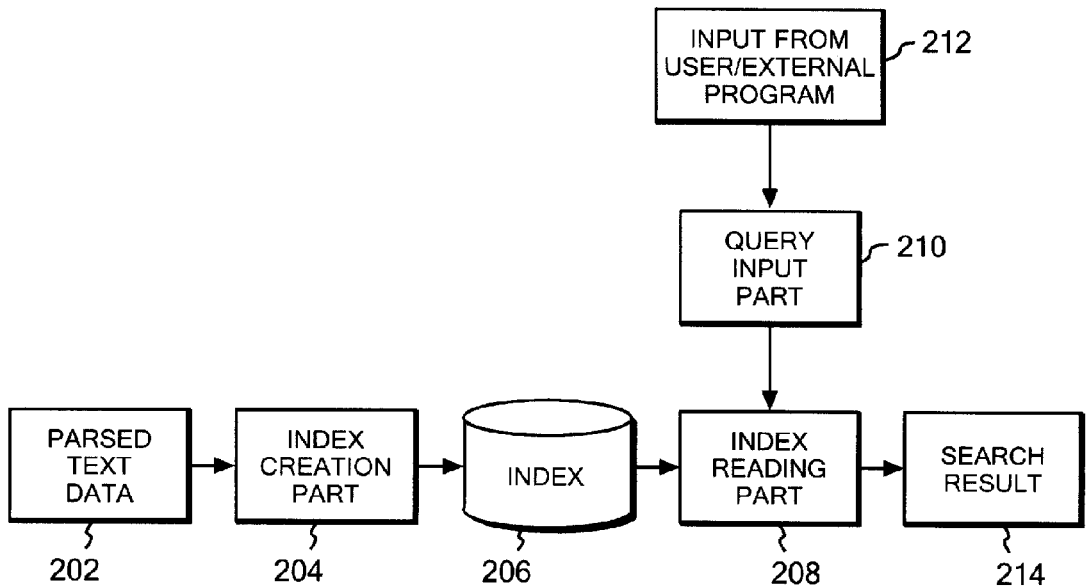
FIG. 2 is a schematic block diagram of a logical configuration for implementing the present invention.

Next, FIG. 2 shows a functional block diagram according to the processing of the present invention. As shown in FIG. 2, for the processing of the present invention, first, the text files obtained are parsed to prepare parsed text data 202. A technique of generating a tree structure by parsing text files is described in Japanese Patent Application Publication Nos. 2001-134575 and 2002-318798. Because such a technique is known and is not a main part of the processing of the present invention, a detailed description thereof is omitted.

Figure 3:
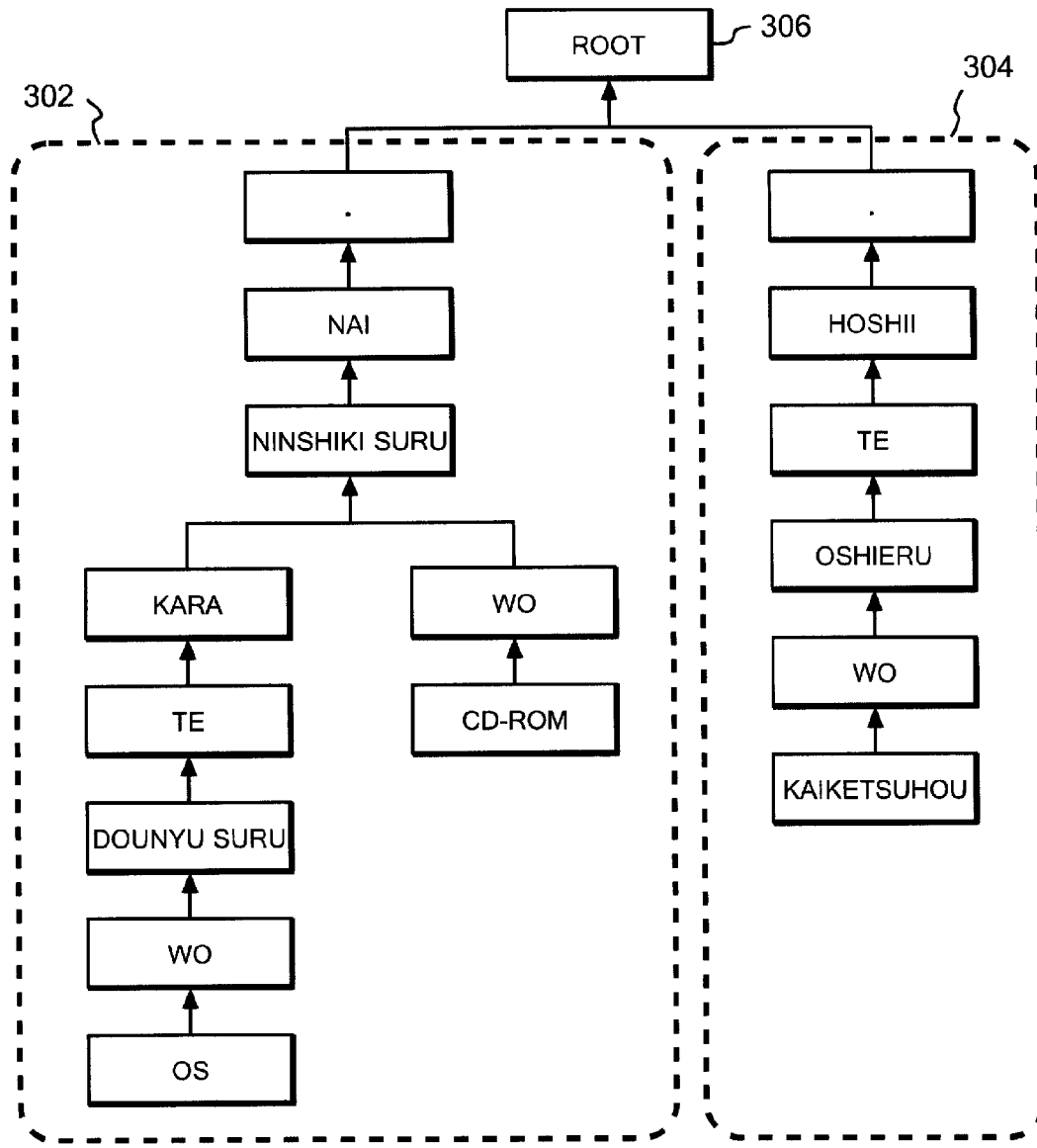
FIG. 3 shows structural trees of documents.

In parsing text data, text data containing a plurality of documents is used as an input, and a word tree structure, in which modifiers are set to be child nodes, is generated as a result of parsing those documents. FIG. 3 shows an example of trees as a result of such parsing, showing a structure in which a tree 302 of a document "OS wo dounyu shite kara CD-ROM wo ninshiki shinai (Never recognize CD-ROM after installing OS)" and a tree 304 of a document "Kaiketsuhou wo oshiete hoshii (Tell me a solution)" are added below a root node 306. Those skilled in the art in the field will understand that such a data structure can be attained by a combination of a structure such as C and C++ and pointers or by an appropriate data structure such as a Java™ class perpetuated in a disk.

Index Creation Part

Figure 4:
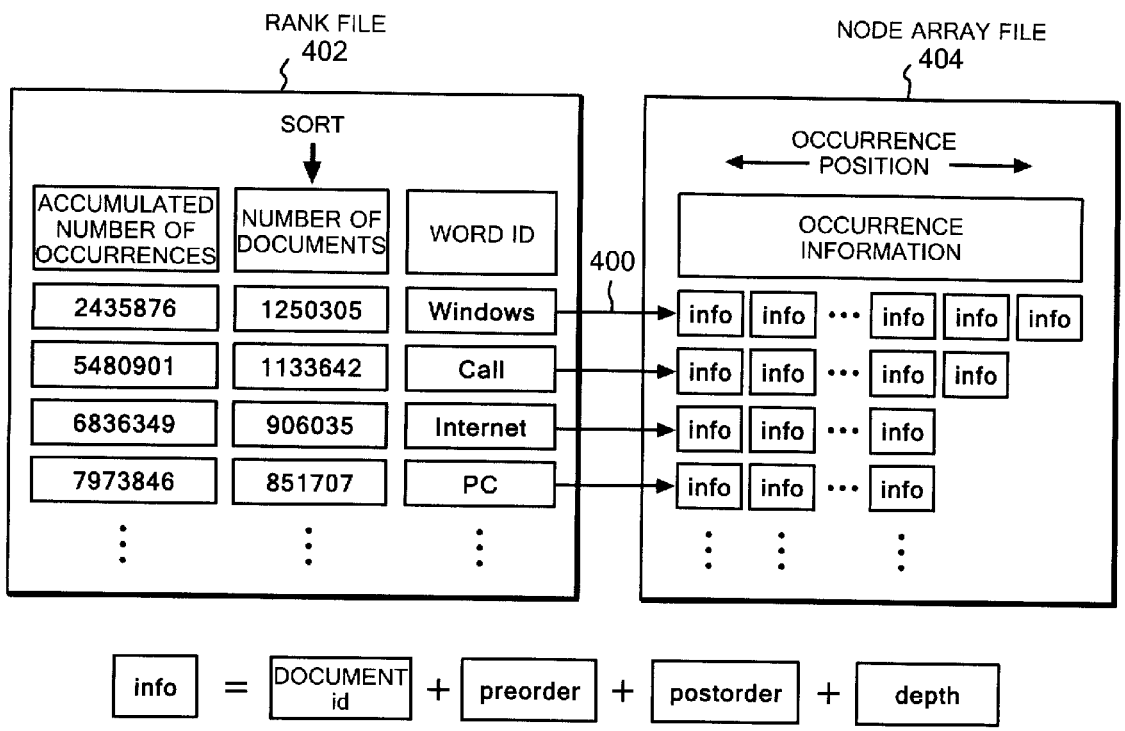
FIG. 4 shows a rank file and a node array file.

An index creation part 204 reads the parsed text data and creates index files shown in FIG. 4. These files are collectively referred to as an index 206 in FIG. 2. Each of the index files includes a rank file 402 and a node array file 404 and is written on the hard disk drive 108.

In the rank file 402, for each of the words appearing in the text data, a set of three elements (an accumulated number of occurrences of each word as a node, the number of documents in which each word appears as a node once or more, and a word ID) is sorted in descending order of the number of documents. The rank file 402 is stored in the hard disk drive 108.

Information on the accumulated number of occurrences is recorded by a search part 1 1302 and a search part 2 1304, both of which will be described later in connection with FIG. 13. Moreover, information on the number of documents and the word ID is used by a top N calculation part 1308 to be described later also in connection with FIG. 13. The information on the accumulated number of occurrences represents an accumulation of the number of info (to be described later in connection with FIG. 4) blocks up to the relevant row in the node array file 404. Therefore, the information virtually serves as a pointer.

The node array file 404 is recorded in the hard disk drive 108. Specifically, in the node array file 404, an occurrence position of each word in the text data is represented by a set of four elements (shown as info in FIG. 4) of a document ID, a preorder, a postorder, and a depth (depth on the tree). The preorder represents the position of each node in a tree from the root node. The postorder represents the position of each node in a tree from one of terminal nodes toward the root node. Note that, although the order of the nodes is not originally given to the tree on the text data, the order is uniquely determined by use of an appropriate method such as in an offset order of the words. The occurrence positions are sorted in descending order of the number of documents for each word as a primary class; in ascending order of the document ID; in ascending order of the depth; and in ascending order of the preorder. As a result, the occurrence positions: of each depth; of each document ID; and of each number of documents for each word are arranged in ascending order of the preorder.

Because the preorder is unique in each sentence, the occurrence information after sorted in the former three orders is uniquely sorted in ascending order of the preorder. A rank of each word ID in the rank file 402 is separately retained by use of a map-type index as indicated by an arrow 400 in FIG. 4.

Figure 7:
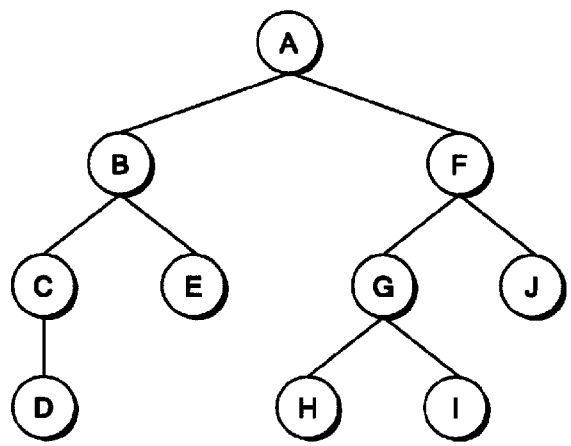
FIG. 7 shows a relationship between a structural tree and a preorder and a postorder.
Figure 7:
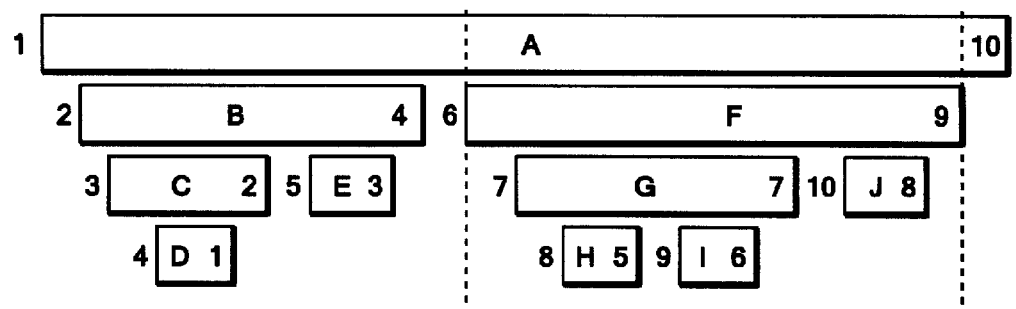

Note that additional description will be given of the preorder, the postorder and the depth with reference to FIG. 7. FIG. 7 shows an example of a tree having nodes A to J. In this example (a), when the node A is set as a starting point, a preorder is ABCDEFGHIJ. These nodes are sequentially numbered, such as 1, 2, . . . . For example, preorder=3 is C and preorder=5 is E. This preorder numbering algorithm will be described later with reference to FIG. 8.

Meanwhile, when the node D is set as a starting point, a postorder is DCEBHIGJFA. These nodes are sequentially numbered, such as 1, 2, . . . . For example, postorder=4 is B and postorder=6 is I. This postorder numbering algorithm will be described later with reference to FIG. 9.

FIG. 7 (b) shows the case where the nodes A to J are graphically represented in a different perspective with the preorder and postorder described above. The nodes are represented in rectangles. Moreover, the order of the numbers shown to the left sides of the rectangles is the preorder, and the order of the numbers shown on the right sides thereof is the postorder. According to the orders described above, a necessary and sufficient condition for a node x to come higher than a node y is as follows:

preorder of x>preorder of y and postorder of y<postorder of x.

Assuming that, for example, the node F in FIG. 7 is the node x, whether or not the node y comes lower than the node x is determined by whether or not left and right edges of the box of the node y are within a range defined by dotted lines in FIG. 7 (b).

Moreover, as to the depth, depth (A)=1
depth (B)=depth (F)=2
depth (C)=depth (E)=depth (G)=depth (J)=3
depth (D)=depth (H)=depth (I)=4

Figure 5:
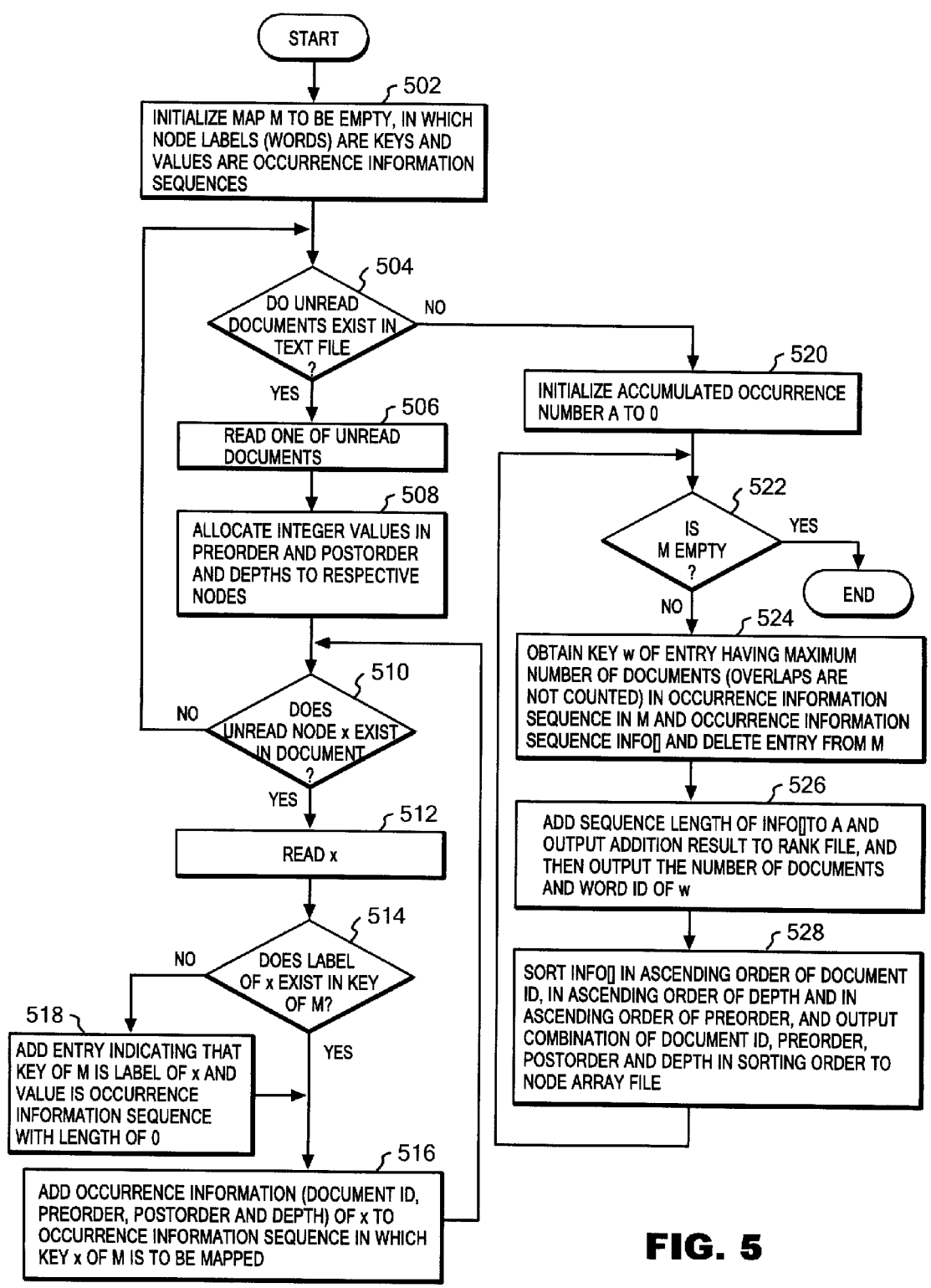
FIG. 5 is a flowchart showing processing for creating the rank file and the node array file.

Next, with reference to a flowchart shown in FIG. 5, index creation processing by the index creation part 204 will be described more in detail. In FIG. 5, a map M in which node labels (words) are keys and values are occurrence information sequences is initialized in Step 502.

Note that, in the processing shown in FIG. 5, under restriction by the main memory, input text data files are divided for each appropriate document ID and a size is suppressed to a certain level (for example, 500 MB) or lower. Thereafter, intermediate rank files and node array files are outputted to the divided document groups.

In Step 504, it is determined whether or not unread documents exist in text files. If the unread documents still exist in the text files, one of the unread documents is read in Step 506. Here, the document, that is, a text sentence, is a unit such as the document 302 or the document 304 in the tree structure shown in FIG. 3.

In Step 508, integer values in preorder, postorder and depths are allocated to each of the nodes in the read document. This processing will be described in detail later in connection with flowcharts in FIGS. 8 to 10.

In Step 510, it is determined whether or not an unread node x exists in the document. If the unread node x exists, the unread node x is read. Thereafter, in Step 514, it is determined whether or not a label of x exists in the key of M.

If a result of the determination in Step 514 is positive, in Step 516, occurrence information (document ID, preorder, postorder and depth) of x is added to an occurrence information array in which a key x of M is to be mapped. Thereafter, the processing returns to Step 510.

If the result of the determination in Step 514 is negative, in Step 518, an entry where the key of M is the label of x and the value is the occurrence information array having a length of 0 is added. Thereafter, the processing returns to Step 510 through Step 516.

If it is determined, back in Step 510, that the unread node x no longer exists in the document, the processing returns to Step 504. If it is determined in Step 504 that the unread document no longer exists in the text file, an accumulated occurrence number a is initialized to 0 in Step 520. Thereafter, the processing moves to Step 522 where it is determined whether or not M is empty.

If M is not empty, in Step 524, an entry w having the maximum number of documents (overlaps are not counted) in the occurrence information array in M and the occurrence information array info[ ] are acquired and the entry is deleted from M.

Next, in Step 526, an array length of info[ ] is added to a and a result of the addition is outputted to the rank file. Subsequently, the number of documents and a word ID of w are also outputted to the rank file.

Next, in Step 528, info[ ] is sorted in ascending order of the document ID, in ascending order of the depth and in ascending order of the preorder, and a set of the document ID, the preorder, the postorder and the depth is outputted in the sorted order to the node array file 404.

Thus, when Steps 524, 526 and 528 are completed for all the entries in M, the determination in Step 522 becomes positive and the processing is completed.

As a result of the above processing, intermediate rank files and intermediate node array files are outputted to each of the document groups obtained by dividing the input text data files for each appropriate document ID.

Figure 6:
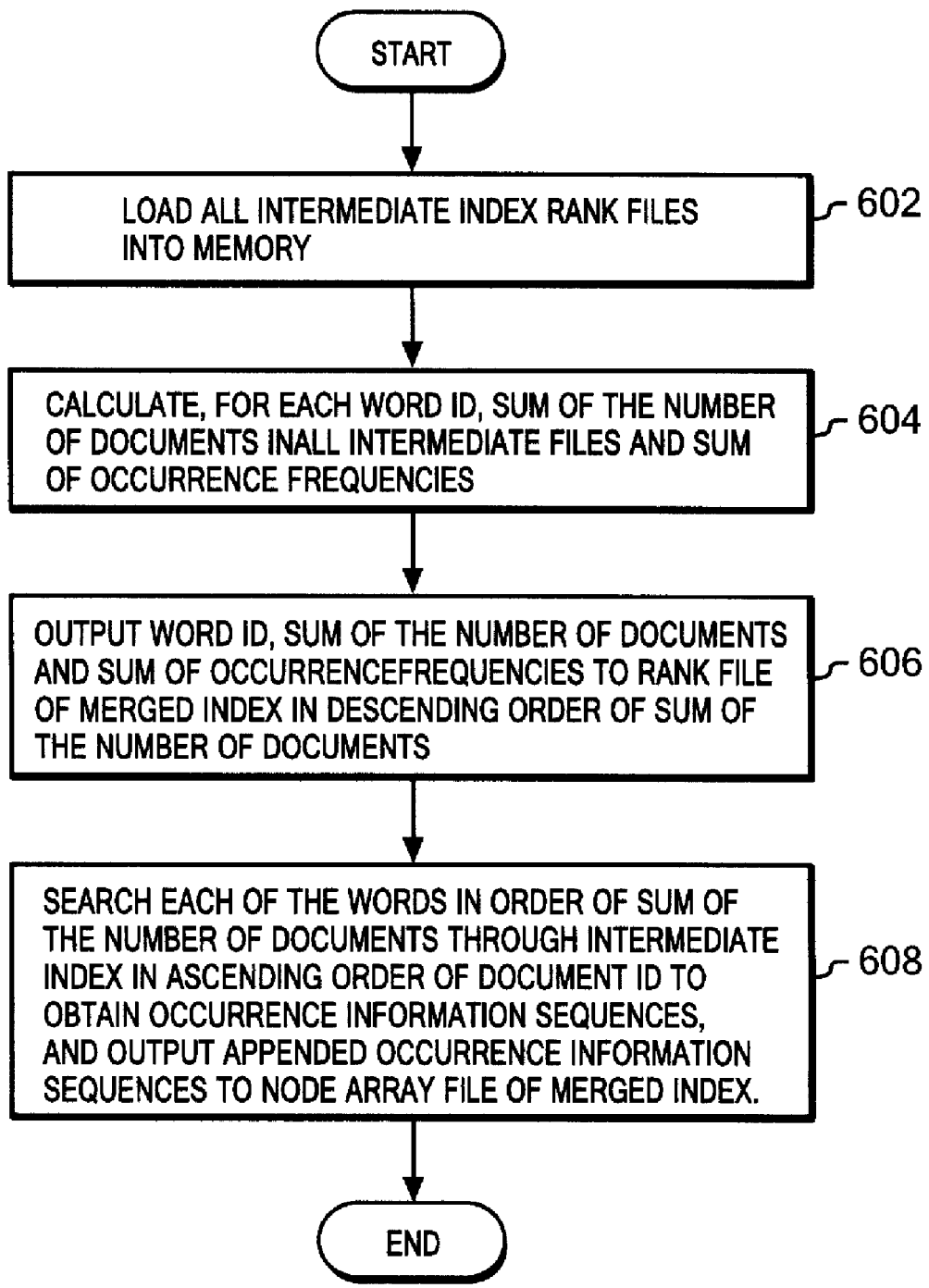
FIG. 6 is a flowchart showing processing for creating the rank file and the node array file.

FIG. 6 is a flowchart of processing for generating a single rank file 402 and node array file 404 by merging such intermediate rank files and intermediate node array files.

In Step 602 in FIG. 6, all the intermediate rank files are loaded into the memory. In Step 604, for each word ID, a sum of the number of documents in all the intermediate rank files and a sum of occurrence frequencies are calculated.

In Step 606, the word ID, the sum of the number of documents and the sum of occurrence frequencies are outputted to a resultant rank file 402 in descending order of the sum of the number of documents.

In Step 608, the words in the order of the sum of the number of documents are searched one by one through the intermediate node array files in ascending order of the document ID to obtain occurrence information sequences. Thereafter, the occurrence information sequences obtained are added up and outputted to a resultant node array file 404.

Figure 8:
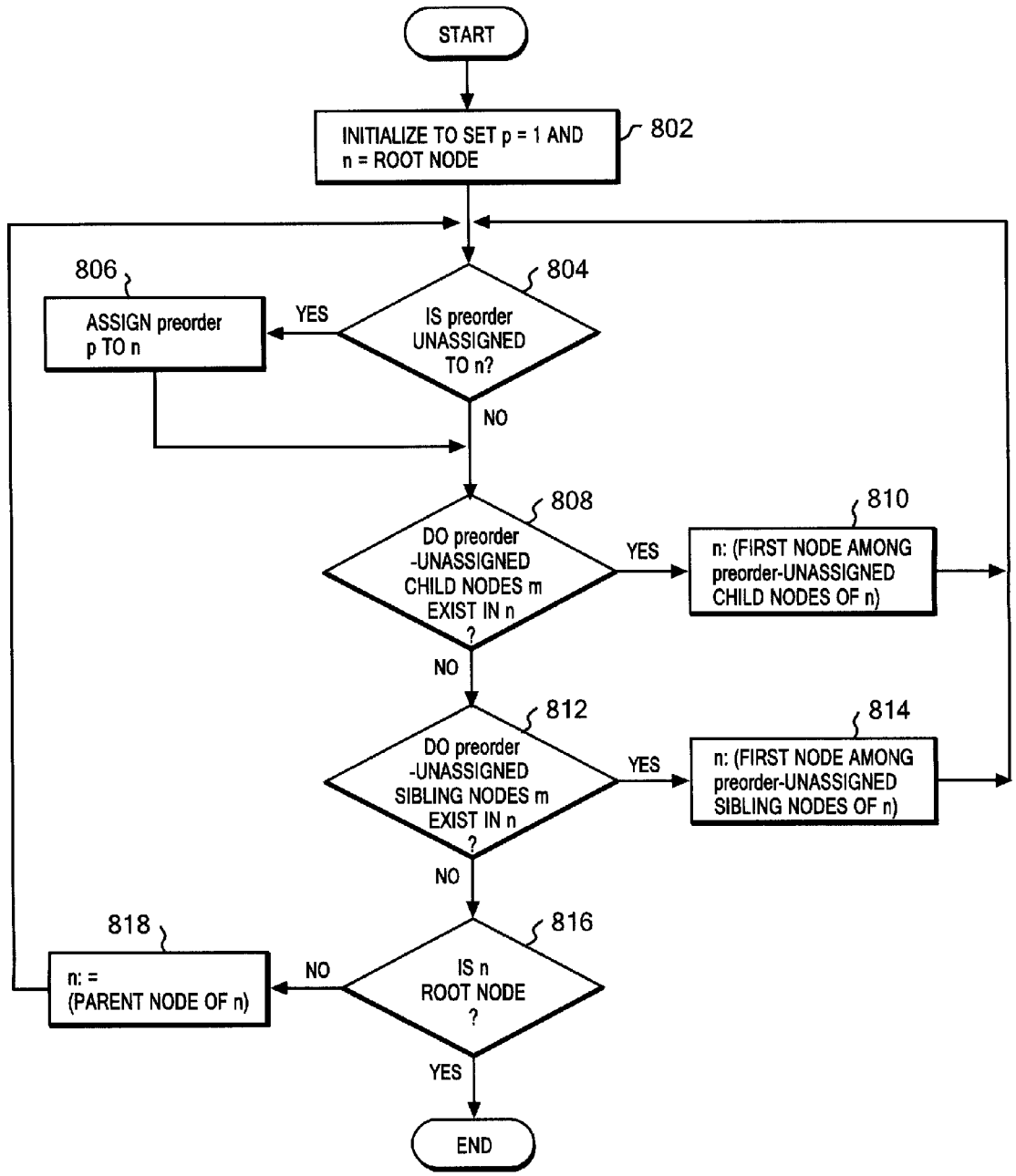
FIG. 8 is a flowchart showing processing of assigning the preorder to a node in the structural tree.

Next, with reference to the flowchart of FIG. 8, processing of assigning a preorder to a node will be described. In Step 802, initialization is executed to set p=1 and n=root node.

In Step 804, it is determined whether a preorder is unassigned to a node n. If so, a preorder p is assigned to the node n in Step 806.

If the determination in Step 804 is negative, it is determined in Step 808 whether or not preorder-unassigned child nodes exist in n. If so, a first node among the preorder-unassigned child nodes of n is assigned to n in Step 810. Thereafter, the processing returns to Step 804.

If the determination in Step 808 is negative, it is determined in Step 812 whether or not preorder-unassigned sibling nodes exist in n. If so, a first node among the preorder-unassigned sibling nodes of n is assigned to n in Step 814. Thereafter, the processing returns to Step 804.

If the determination in Step 812 is negative, it is determined in Step 816 whether or not n is the root node. If so, the processing is completed, and if not, a parent node of n is assigned to n in Step 818 and then the processing returns to Step 804.

Figure 9:
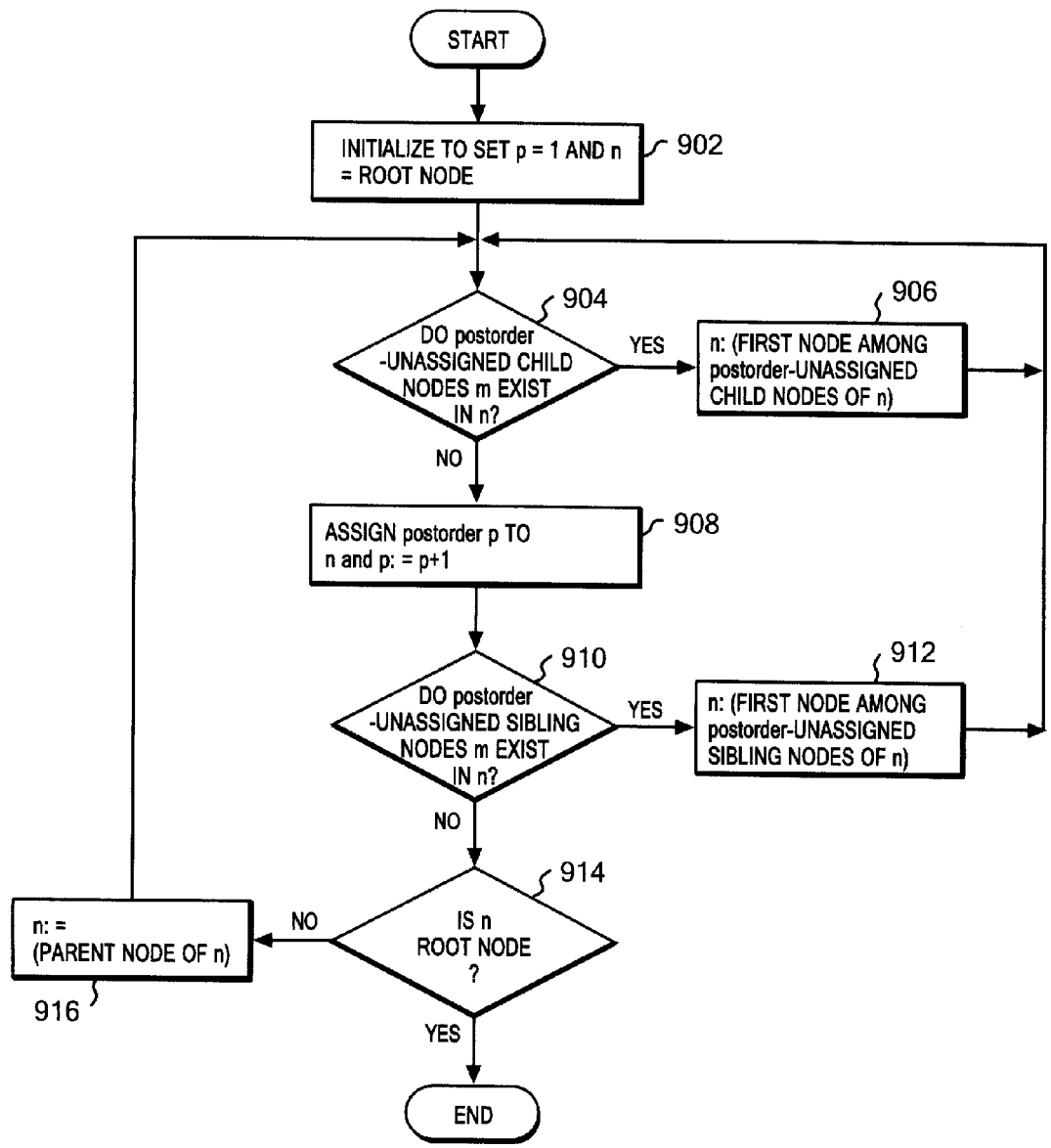
FIG. 9 is a flowchart showing processing of assigning the postorder to the node in the structural tree.

Next, with reference to the flowchart of FIG. 9, processing of assigning a postorder to a node will be described. In Step 902, initialization is executed to set p=1 and n=root node.

In Step 904, it is determined whether or not postorder-unassigned child nodes m exist in the node n. If so, a first node among the postorder-unassigned child nodes of n is assigned to the node n in Step 906. Thereafter, the processing returns to Step 904.

If the result of the determination in Step 904 is negative, a postorder p is assigned to n and p is incremented by 1.

In Step 910, it is determined whether or not postorder-unassigned sibling nodes m exist in the node n. If so, a first node among the postorder-unassigned sibling nodes of n is assigned to the node n. Thereafter, the processing returns to Step 904.

If the result of the determination in Step 910 is negative, it is determined in Step 914 whether or not n is the root node. If so, the processing is completed, and if not, a parent node of n is assigned to n in Step 916 and then the processing returns to Step 904.

Figure 10:
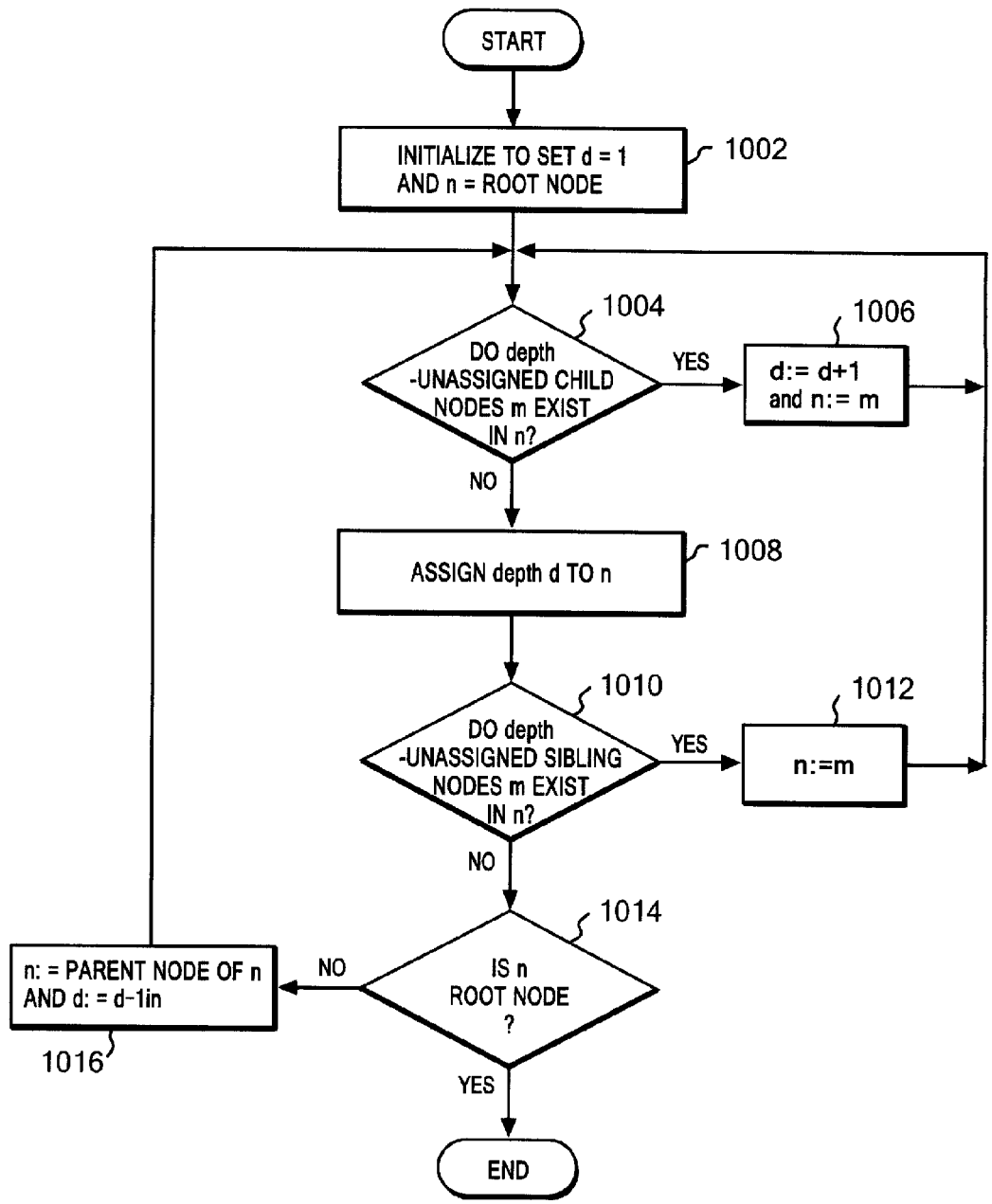
FIG. 10 is a flowchart showing processing of assigning a depth to the node in the structural tree.

Next, with reference to the flowchart of FIG. 10, processing of assigning a depth to a node will be described. In Step 1002, initialization is executed to set a depth value d=1 and n=root node. In Step 1004, it is determined whether or not depth-unassigned child nodes m exist in the node n. If so, d is incremented by 1 and m is assigned to n in Step 1006. Thereafter, the processing returns to Step 1004.

If the result of the determination in Step 1004 is negative, the depth d is assigned to the node n in Step 1008. Next, in Step 1010, it is determined whether or not depth-unassigned sibling nodes m exist in the node n. If so, m is assigned to n in Step 1012 and the processing returns to Step 1004.

If the result of the determination in Step 1010 is negative, it is determined in Step 1014 whether or not n is the root node. If so, the processing is completed, and if not, a parent node of n is assigned to n and d is reduced by 1 in Step 1016. Thereafter, the processing returns to Step 1004.

Query Input Part

A query input part 210 (FIG. 2) receives a query having the following as parameters from a user or an external application program:

Search pattern: a tree having words as node labels, where each branch has a positive integer attribute meaning a node maximum depth difference.

Node pivot on search pattern: a reference of search pattern extension.

Positive integer d specifying maximum depth difference from pivot

Positive integer N: the maximum number of extended node label candidates to be obtained.

Flag: if the flag is true, an upper node of the pivot that frequently appears is searched for. If the flag is false, a lower node of the pivot that frequently appears is searched for. Generally, if the flag is true, the pivot serves as a root node of the search pattern.

A function of associating the labels with the nodes is represented by L and the search pattern is represented by P={Np, Bp, D}.

Here, Np is a set of nodes, Bp is a set of branches (parent nodes and child nodes), and D is a function of returning a maximum depth difference to the branches. The search pattern P matches a document T={$N_T$, $B_T$} when the following is satisfied.

[Expression 1]

When $N_p=\{n_1, n_2, \ldots, n_k\}$, $\exists m_1, m_2, \ldots, m_k \lfloor N_T$ satisfies the 1. $L(n_i)=L(m_i)$ (i=1, 2, ..., k)
2. $(n_i, n_j) \in B_p$ (parent and child)
↔ $\exists m_{i0}, m_{i1}, \ldots, m_{iM} \in N_T$ satisfies the following $$(m_{i0},m_{i1}),(m_{i1},m_{i2}),\ldots,(m_{iM-1},m_{iM}) \in B_T, i_0=i, i_M=j$$
(upper/lower)

The proposition to the right of will be hereinafter represented by $m_i >> m_j$ (M).

3. Under the above, $M \leq D((n_i, n_j))$ (depth difference condition)

This means that the document including the search pattern is searched for in such a manner that allows a gap between the parent and child nodes. In calculation of a top N word in a frequency order, assuming that one with the same word as the pivot, among the above $m_1, m_2, \ldots, m_k$, is m*, if the flag=true, the number of documents including those that satisfy m>>m* (M), M<=d at m∈$N_T$ with the words as the labels is set to be a frequency for each word.

If the flag=false, the above conditions are set to m<<m* (M), M<=d.

Figure 11:
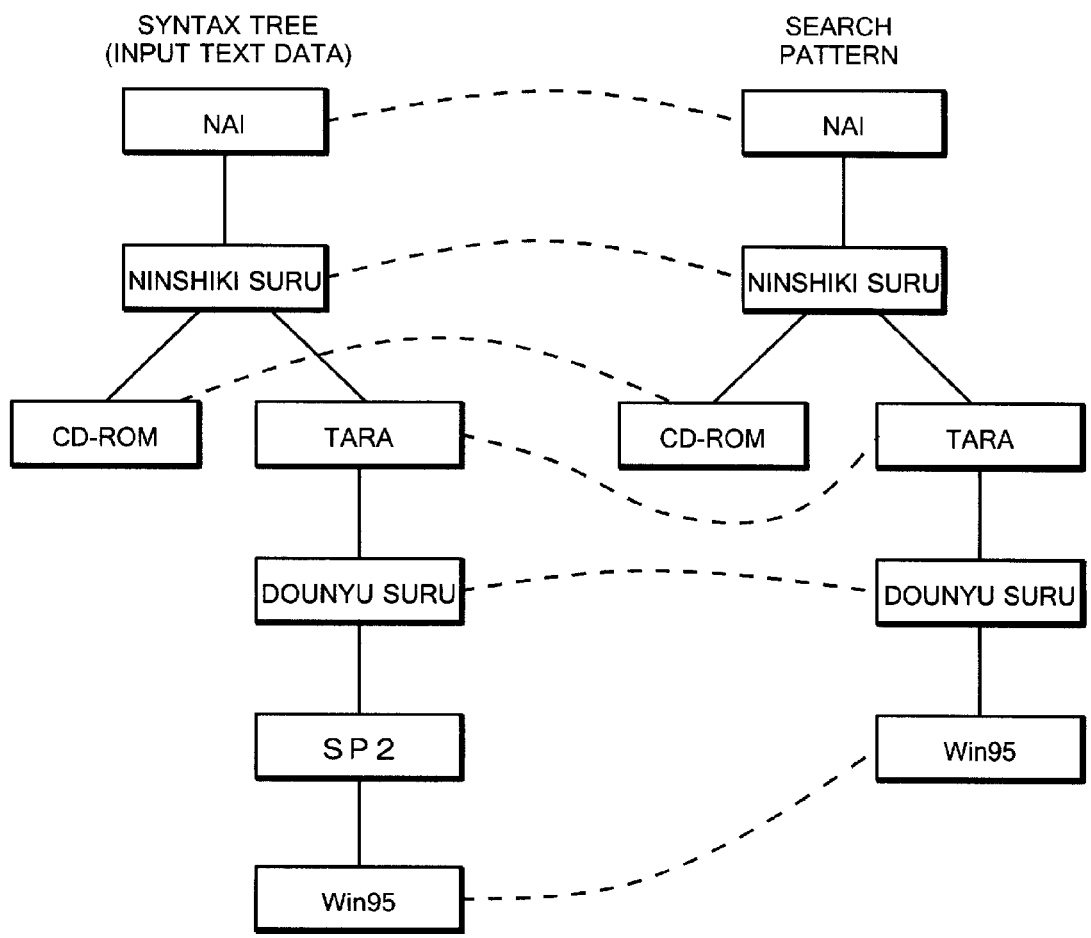
FIG. 11 shows a relationship between a structural tree and a search pattern.

FIG. 11 shows pattern matching of a search pattern with a syntax tree of input text data. In an example shown in FIG. 11, the pattern matches the syntax tree except for a node having a label "SP2".

Figure 12:
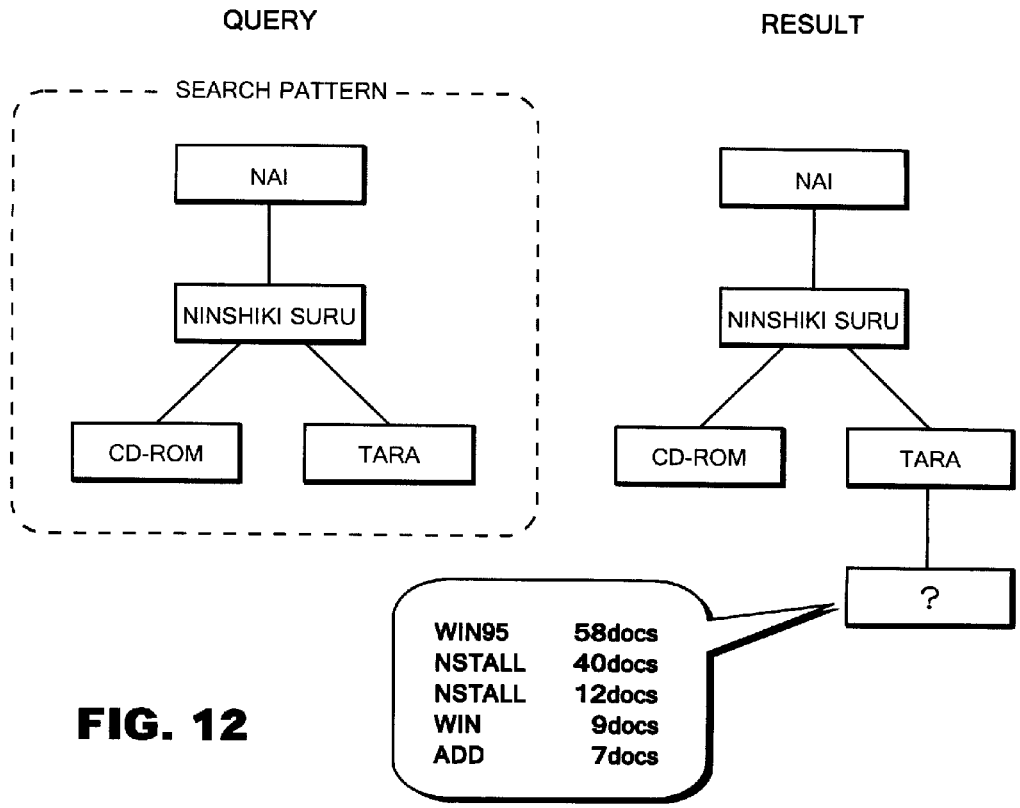
FIG. 12 shows keywords related to a pivot in a search result.

FIG. 12 shows an example of a pivot in a search pattern. In FIG. 12, a node having a label "tara" is specified as a pivot and, as a result, a document matching this query is searched for. In this event, a word to be entered into a child node of the pivot and the number of documents corresponding thereto are obtained as indicated by a balloon 1202, for example.

Index Reading Part

Figure 13:
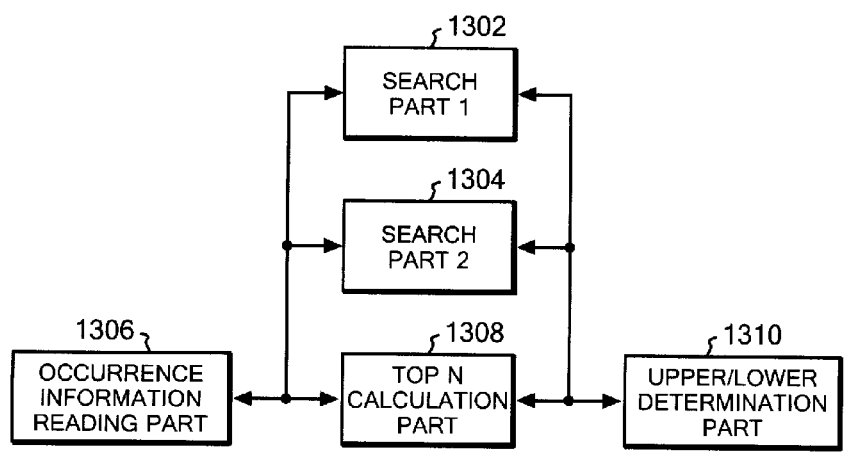
FIG. 13 is a schematic block diagram of a logical configuration for search processing.

As shown in FIG. 13, an index reading part 208 includes the search part 1 1302, the search part 2 1304, an occurrence information reading part 1306, a top N calculation part 1308 and an upper/lower determination part 1310.

Figure 14:
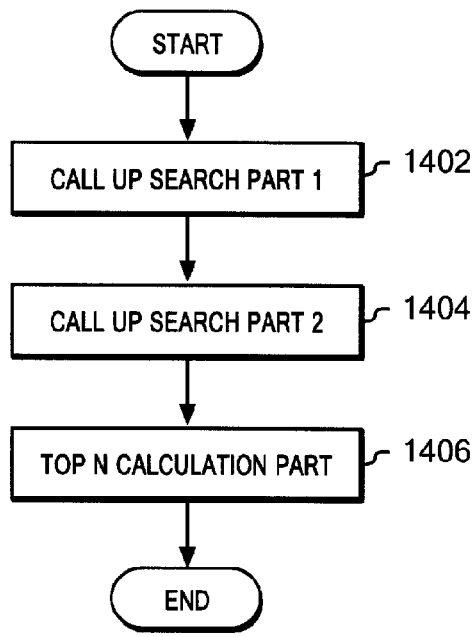
FIG. 14 is a flowchart schematically showing the search processing.

With reference to a flowchart of FIG. 14, operations of the index reading part 208 will be schematically described. As shown in FIG. 14, the search part 1 is called up in Step 1402, the search part 2 is called up in Step 1404 and then the top N calculation part 1308 is called up in Step 1406. In this event, the occurrence information reading part 1306 and the upper/lower determination part 1310 are supplementarily called up.

Next, functions of the respective functional blocks of the index reading part 208 will be described in detail.

First, the occurrence information reading part 1306 reads the indices shown in FIG. 4 by each row to create occurrence information sequences. The occurrence information reading part 1306, when called up by the search part 1 1302 and the search part 2 1304 to create an occurrence information array of a specified word, reads accumulation of occurrence frequency of a corresponding word ID in the rank file 402 and uses the information as an offset to randomly access a top of a corresponding row in the node array file 404. Thereafter, the occurrence information reading part 1306 reads the occurrence information array by performing a sequential access. A position of each word ID in the rank file 402 is checked by use of a separately retained map-type index.

With reference to a flowchart of FIG. 15, description will be given of processing in the case where the index reading part 208 is called up by the search part 1 1302 and the search part 2 1304. In Step 1502 in FIG. 15, a spot of w that is a specified word ID on the rank file 402 is accessed and p(w), that is the accumulated number of occurrences of the word, and q (w), that is the accumulated number of occurrences of a word that comes higher than the specified word, are read. Note that input from the query input part 210 is not the word ID but the word. Thus, it is required to find out a corresponding word ID from the word.

Figure 15:
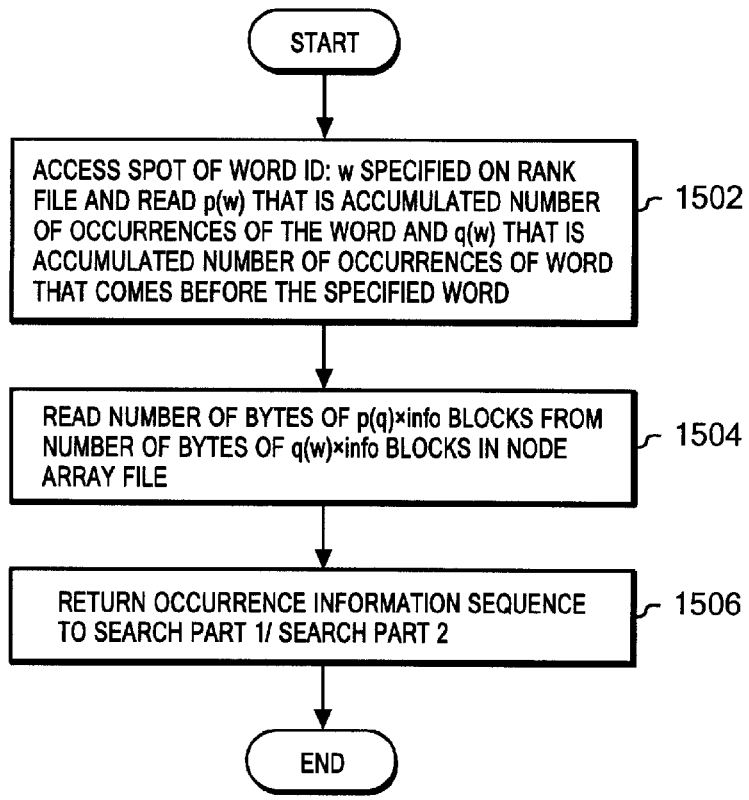
FIG. 15 is a flowchart showing processing in the case where an index reading part is called up by a search part 1 and a search part 2.

Therefore, although not shown in FIG. 15, a map is created by use of hashes for (1) correspondence of the word to the word ID, (2) ranking of the word on the rank file 402 based on the word ID and (3) correspondence of the word ID to the word.

When a word character string w to be searched for is given, a word ID is first obtained by using the hash of the above (1). Thereafter, a rank r is obtained by using the hash of the above (2). Accordingly, a position of the word w on the rank file 402 can be accessed by the following.

$$(r-1)\times\{(\text{number of bytes of [the accumulated number of occurrences]})+(\text{number of bytes of [number of documents]})+(\text{number of bytes of [word ID]})\}$$

Thus, n2=[the accumulated number of occurrences] of w and n1=[the accumulated number of occurrences] of a rank that comes higher than w are read.

Note, however, that n1=0 when w is the top rank.

n1×(number of bytes of [info] blocks) to n2×(number of bytes of [info] blocks) in the node array file 404 are read by the sequential access and the occurrence information sequences are returned. Those described above will be repetitively described in the following steps. [info] described here is such as that shown in FIG. 4.

In Step 1504, the number of bytes of p(q)×info blocks is read from the number of bytes of q(w)×info blocks in the node array file 404. In Step 1506, occurrence information thus obtained is returned to the search part 1/the search part 2 that has called up.

When called up by the top N calculation part 1308 to read the occurrence information sequences of the words in the order of the number of documents, the occurrence information reading part 1306 reads all the occurrence information sequences by the sequential access and sequentially outputs the sequences.

Figure 16:
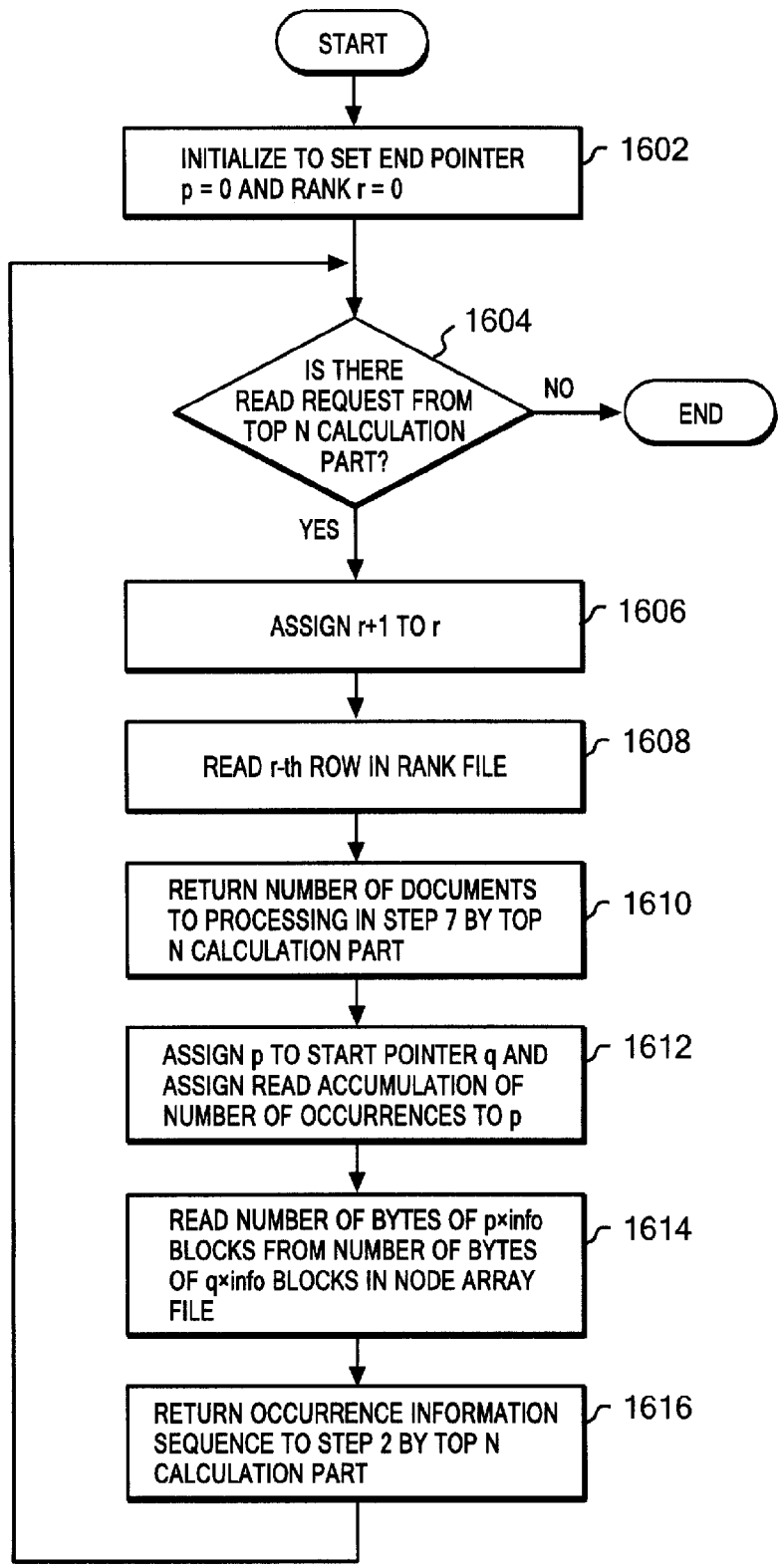
FIG. 16 is a flowchart showing processing in the case where the index reading part is called up by a top N calculation part.

With reference to a flowchart of FIG. 16, description will be given of processing in the case where the index reading part 208 is called up by the top N calculation part 1308. In Step 1602 in FIG. 16, initialization is executed to set an end pointer p=0 and a rank r=0.

In Step 1604, it is determined whether or not there is a read request from the top N calculation part 1308. If there is no read request, the processing is finished.

If it is determined in Step 1604 that there is a read request from the top N calculation part 1308, 1 is added to r in Step 1606. Thereafter, an r-th row in the rank file 402 is read in Step 1608.

In Step 1610, the number of documents is returned to processing in Step 7 (to be described later) by the top N calculation part 1308.

In Step 1612, p is assigned to a start pointer q and the read accumulated number of occurrences is assigned to p.

In Step 1614, the number of bytes of p×info blocks is read from the number of bytes of q×info blocks in the node array file 404.

In Step 1616, the occurrence information sequences are returned to Step 2 (to be described later) performed by the top N calculation part 1308.

Next, the upper/lower determination part 1310 will be described. The upper/lower determination part 1310 receives two occurrence information sequences, upper_candidates and lower_candidates, and a maximum depth difference d, and outputs filtered_upper_candidates and filtered_lower- _candidates obtained by filtering only those belonging to a pair that satisfies upper/lower conditions and depth difference conditions. The calculation steps are as follows:

1. pointers of upper_candidates and lower_candidates are set to 0.
2. the pointer having a smaller document ID is moved forward until document IDs of the current pointers of upper_candidates and lower_candidates are set equal. The processing is finished when the pointer reaches the end of the array in the middle of the processing.
3. the pointer of lower_candidates is moved forward until a depth of lower_candidates is set larger than a depth of upper_candidates within a range where the document IDs are equal. The processing returns to Step 2 when the range where the document IDs are equal is exceeded in the middle of the processing.
4. the pointer of lower_candidates is moved forward within a range where the depth of lower_candidates is equal to or larger than (the depth of upper_candidates+d), and occurrence information on upper_candidates and lower_candidates are added to filtered_upper_candidates and filtered_lower_candidates, respectively, at spots where current preorder and postorder of lower_candidates are set larger or smaller than current preorder and postorder of upper_candidates.
5. the pointer of lower_candidates is returned to the position at the point of Step 3.
6. the pointer of upper_candidates is moved forward by 1, and the processing returns to Step 2.

As to the upper/lower determination part 1310, it can also be said that, when there is one array of occurrence information (document ID, preorder, postorder and depth) on a word A and one array of occurrence information (document ID, preorder, postorder and depth) on a word B, the upper/lower determination part 1310 finds all pairs of occurrence information indicating that an occurrence position of A is higher than an occurrence position of B and the depth difference is within the input parameter d.

In other words, the upper/lower determination part 1310 finds all pairs that satisfy A.preorder<B.preorder and B.postorder<A.postorder when A.document ID=B.document ID. Then, in Step 2 described above, since the sequences are sorted by the document ID, the pointer of the array is moved forward until A.document ID=B.document ID is satisfied.

In Step 3 described above, because the sequences are sorted in ascending order of the depth within a range of the equated document ID, only the array pointer of B is moved forward up to the point where B.depth>=A.depth.

In Step 4 described above, the array pointer of B is moved forward within a range of B.depth<=A.depth+d from the above position of the pointer, and pairs that satisfy A.preorder<B.preorder and B.postorder<A.postorder are extracted within the range.

In the case where only one piece of occurrence information to be a lower node is outputted with respect to one piece of occurrence information, the processing moves to Step 5 after one pair is added to filtered_upper_candidates and filtered_lower_candidates in Step 4. In this case, although a drop-out may occur, the processing can be significantly simplified.

Figure 17:
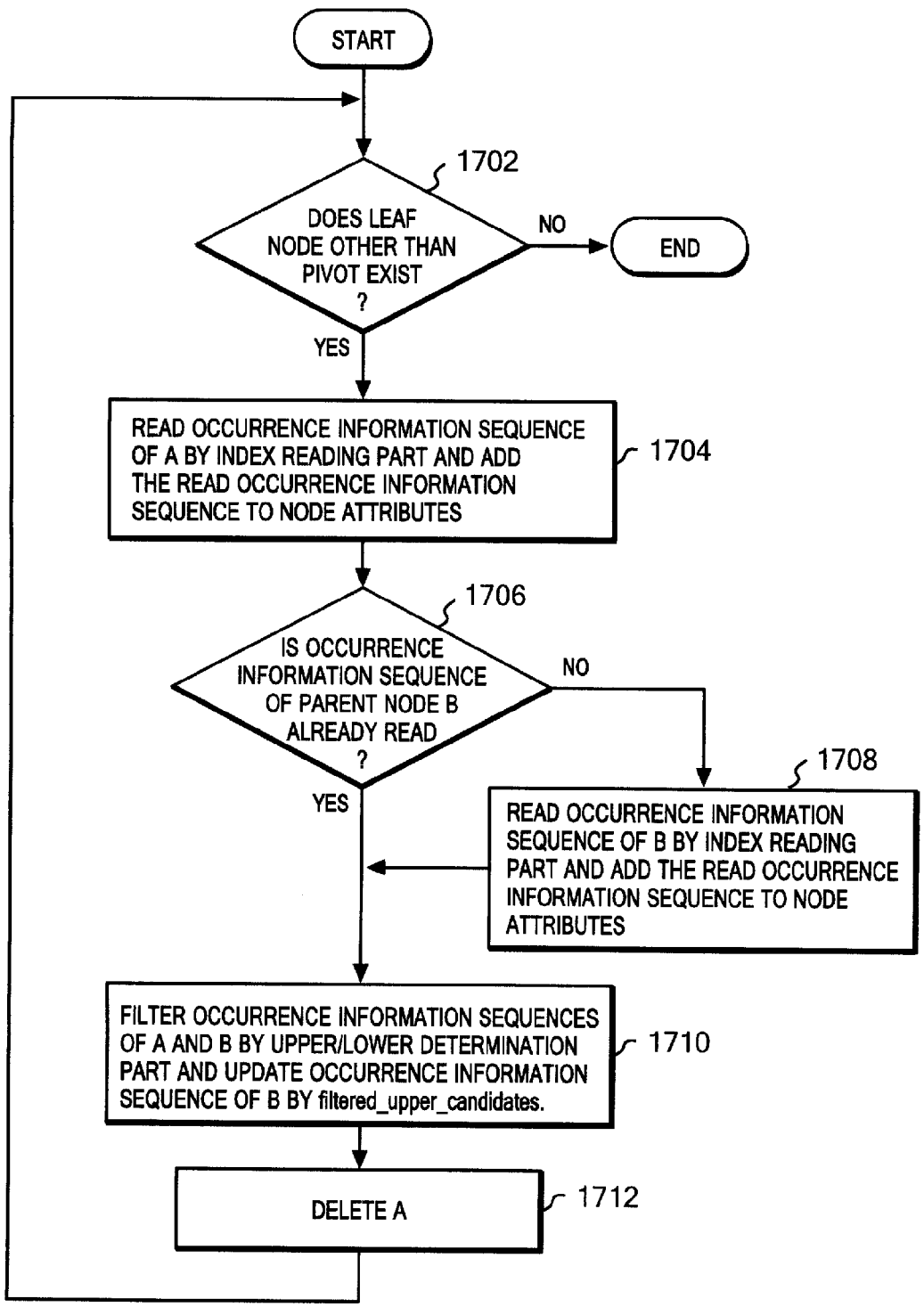
FIG. 17 is a flowchart showing processing by the search part 1.

Next, with reference to a flowchart of FIG. 17, processing by the search part 1 will be described. The search part 1 searches for nodes other than a path n from a root of a search pattern to a pivot. At the end of the processing by the search part 1, the nodes other than π are deleted from the search pattern. Thereafter, in Step 1702 in FIG. 17, it is determined whether or not a leaf node A other than the pivot exists. If no leaf node exists, the processing is terminated.

When it is determined in Step 1702 that the leaf node A other than the pivot exists, the index reading part 208 reads an occurrence information array of the leaf node A and adds the read occurrence information array to node attributes in Step 1704.

In Step 1706, it is determined whether or not an occurrence information array of a parent node B of the leaf node A is already read. If not, the index reading part 208 reads the occurrence information array of the parent node B and adds the read occurrence information array to node attributes in Step 1708. Thereafter, the processing moves to Step 1710. If the occurrence information array of the parent node B of the leaf node A is already read, the processing moves directly to Step 1710.

In Step 1710, the occurrence information sequences of the leaf node A and the parent node B thereof are filtered by the upper/lower determination part 1310, and the occurrence information array of the parent node B is updated by filtered_upper_candidates.

In Step 1712, the leaf node A is deleted. Thereafter, the processing returns to the determination in Step 1702.

Figure 18:
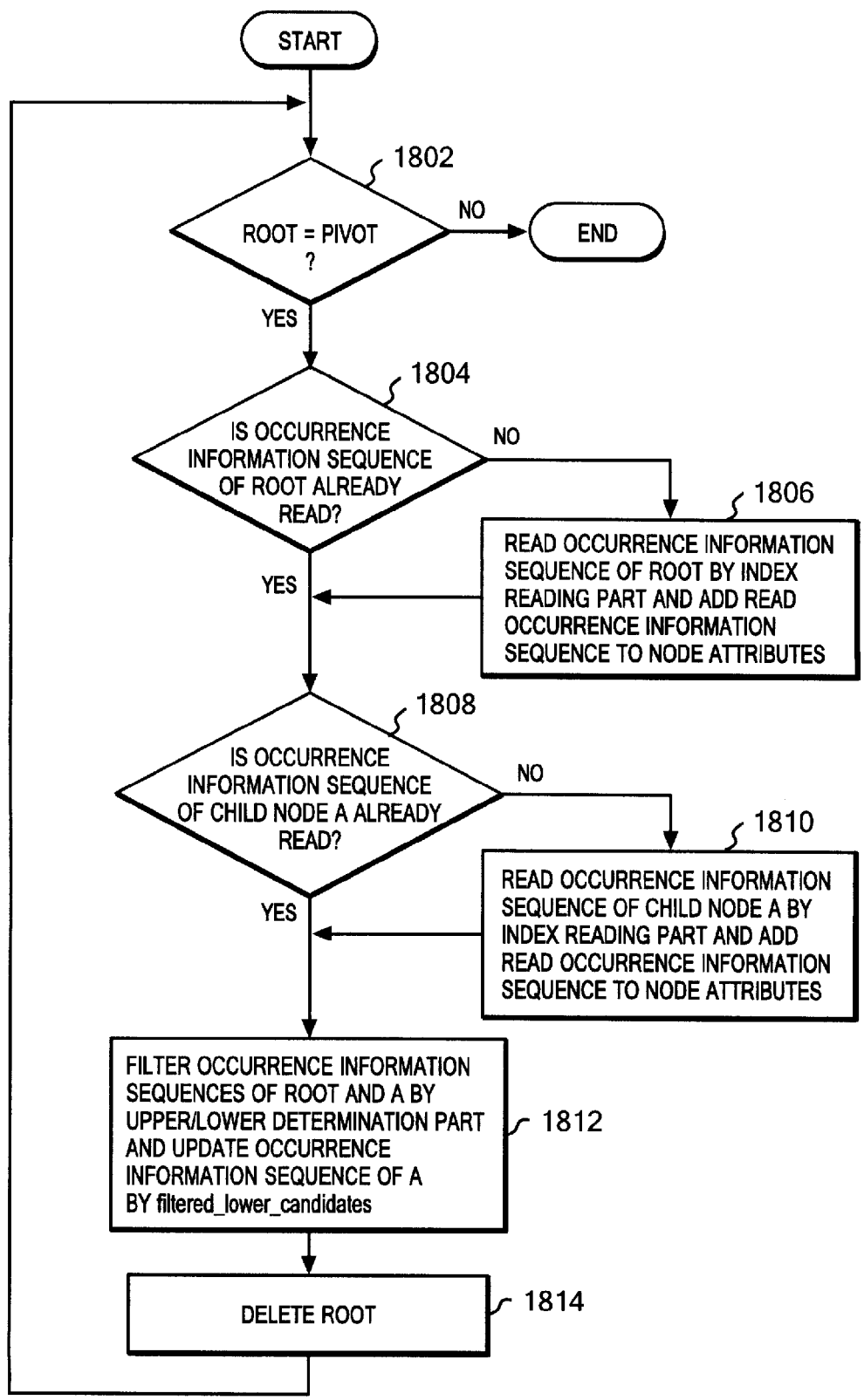
FIG. 18 is a flowchart showing processing by the search part 2.

Next, with reference to a flowchart of FIG. 18, processing by the search part 2 will be described. In Step 1802, the search part 2 determines whether or not the root is the pivot. If the root is not the pivot, the processing is terminated. If the root is the pivot, the processing moves to Step 1804.

In Step 1804, it is determined whether or not an occurrence information array of the root is already read. If not, the index reading part 208 reads the occurrence information array of the root and adds the read occurrence information array to node attributes in Step 1806. Thereafter, the processing moves to Step 1808. If the occurrence information array of the root is already read, the processing moves directly to Step 1808.

In Step 1808, it is determined whether or not an occurrence information array of a child node A is already read. If not, the index reading part 208 reads the occurrence information array of the child node A and adds the read occurrence information array to node attributes in Step 1810. Thereafter, the processing moves to Step 1812. If the occurrence information array of the child node A is already read, the processing moves directly to Step 1812.

In Step 1812, the occurrence information sequences of the root and the child node A thereof are filtered by the upper/lower determination part 1310, and the occurrence information array of the child node A is updated by filtered_lower_candidates.

In Step 1814, the root is deleted. Thereafter, the processing returns to the determination in Step 1802.

Next, the top N calculation part receives an occurrence information array of a pivot, a positive integer N, a maximum depth difference d and a flag, and outputs frequency top N words at a depth within d from the pivot and frequencies thereof. The following is processing in the case of flag=true.

1. A temporary top N set is initialized to an empty set.
2. An occurrence information array of a top word A in the order of sorting by the index among unread words is obtained by the index reading part.
3. The upper/lower determination part filters an occurrence information array of A=upper_candidates and an occurrence information array of the pivot=lower_candidates at the maximum depth difference d, and counts document IDs (except for overlaps) of filtered_upper_candidates.
4. A pair of (A and the frequency calculated in Step 3) is added to the temporary top N set.

5. If the number of elements in the temporary top N set is larger than N, a pair having a lowest frequency is deleted.
6. The processing is terminated unless there are unread words left in the index.
7. The processing is terminated if a frequency of a top unread word in the order of sorting by the index is equal to or lower than a frequency of the pair having the lowest frequency in the temporary top N set. For the determination of termination in this event, the number of documents in the rank file 402 is used. Specifically, because the rank file 402 is preferably sorted by the number of documents, the following keywords are not placed in the ranks obviously with no need of looking at search conditions if the number of documents of a temporarily Nth keyword is equal to or more than the number of documents of an unread keyword even before the file is completely read.
8. The processing returns to Step 2.

Final output is a temporary top N at the point of termination. If flag=false, upper_candidates and lower_candidates are replaced with each other in Step 3 and filtered_upper_candidates turn to filtered_lower_candidates.

Additional Functions

The search pattern described above is created only for the purpose of limiting a search hit target. However, for practical purposes, there is also a case where OR conditions for extending the search hit target by paraphrasing expressions are required. As an example of a search condition for the case "Windows no insutoru ni shippai suru (fail to install Windows)", the following condition is conceivable.

(Windows→insutoru (install)→dekiru (can)→nai (not)
OR (Windows→insutoru (install)→shippai suru (fail)

However, here, considering the case where a paraphrase expression is also specified for "Windows", the number of search patterns undergoes a combinatorial explosion as described below. As a result, efficiency is deteriorated if all the search patterns listed are to be processed.

(Windows→insutoru (install)→dekiru (can)→nai (not))
OR (Windows→insutoru (install)→shippai suru (fail))
OR (WIN→insutoru (install)→dekiru (can)→nai (not))
OR (WIN→insutoru (install)→shippai suru (fail))
OR (windouzu→insutoru (install)→dekiru (can)→nai (not))
OR (windouzu→→shippai suru (fail))

Thus, also in the search processing with the complicated OR conditions as described above, a mechanism for preventing redundant processing is required.

Figure 19:
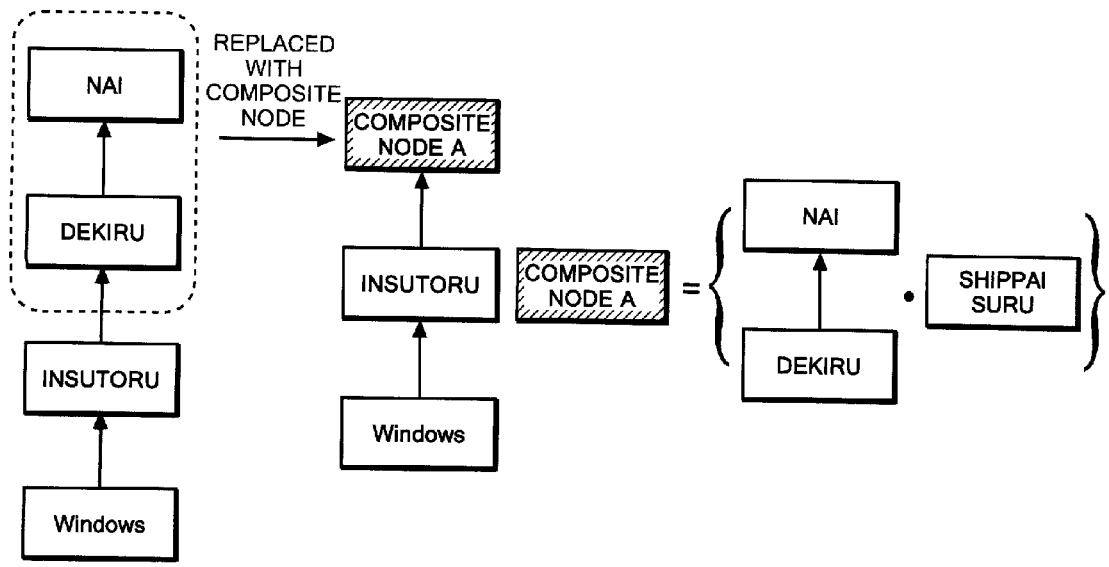
FIG. 19 shows replacement of a portion including a paraphrase expression with a composite node.

In order to prevent redundant processing, it is considered to replace a portion including a paraphrase expression with a special node called a composite node (see FIG. 19). An entity of the composite node is a pointer to a plurality of composite node search patterns (corresponding to a tree of "dekiru (can)→nai (not)" and "shippai suru (fail)" on the right side of FIG. 19). When the composite node is handed over to the occurrence information reading part, occurrence information matching any one of the composite node search patterns (processing will be described later) is returned as two sequences, parent_candidates and child_candidates. When the occurrence information array of the composite node is handed over to the upper/lower determination part, parent_candidates is used for determination of the node as an upper node and child_candidates is used for determination of the node as a lower node. Assuming that an occurrence information array of a node of a normal word label to be returned by the occurrence information reading part is candidates, parent_candidates and child_candidates of the node are defined as parent_candidates=child_candidates=candidates. Thus, the processing of the word node and the composite node can be handled without any distinction outside the occurrence information reading part.

Figure 20:
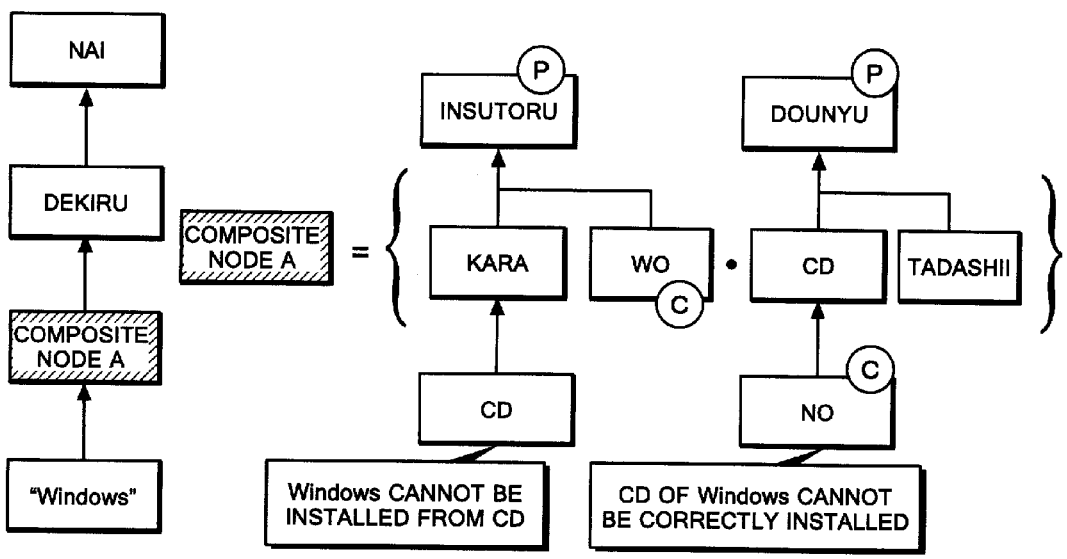
FIG. 20 shows an object structure of a composite node search pattern.

An object structure of the composite node search pattern is realized by allowing an object of the same type as the search pattern to newly have a pointer to a node called child-connecting_node. FIG. 20 shows an example of the object structure, in which a root node is represented by "P" and child-connecting_node is represented by "C". The root node "P" means a node to be connected to a parent node of the composite node, and child-connecting_node "C" means a node to be connected to a child node of the composite node. Moreover, a maximum depth difference is defined on a search pattern (a leftmost tree in FIG. 20) which includes the composite node as a node. Thus, a maximum depth difference between the root in each composite node search pattern and an upper node thereof and a maximum depth difference between child-connecting_node and a lower node thereof are common to all the composite node search patterns.

A mechanism to calculate parent_candidates and child_candidates for the composite node search pattern will be described below. First, a pivot is set to be a root node according to the logic of the search part 1 and an occurrence information array of the root node is obtained. The obtained occurrence information array is set as parent_candidates. Thereafter, as to a tree including a path from the root node to child-connecting_node, in a state where the occurrence information array of the root node is set as parent_candidates described above, the logic of the search part 2 is applied to pivot=child-connecting_node to calculate an occurrence information array of child-connecting_node. Subsequently, the calculated occurrence information array is outputted as child_candidates. After parent_candidates and child_candidates of each of the composite node search patterns are calculated, those are appended as sequences. Although an nth element (n=0, 1, . . . ) of parent_candidates and that of child_candidates are paired, elements completely overlapping as a pair in appending is put together by removing overlaps. Thus, the pattern search and top N calculation using the search pattern including the composite node as a parameter can be performed.

In the conventional technique, pattern creation involves trial and error, and there are sequential processes to go through from pattern editing to result browsing. Thus, the conventional technique has very poor efficiency.

Figure 21:
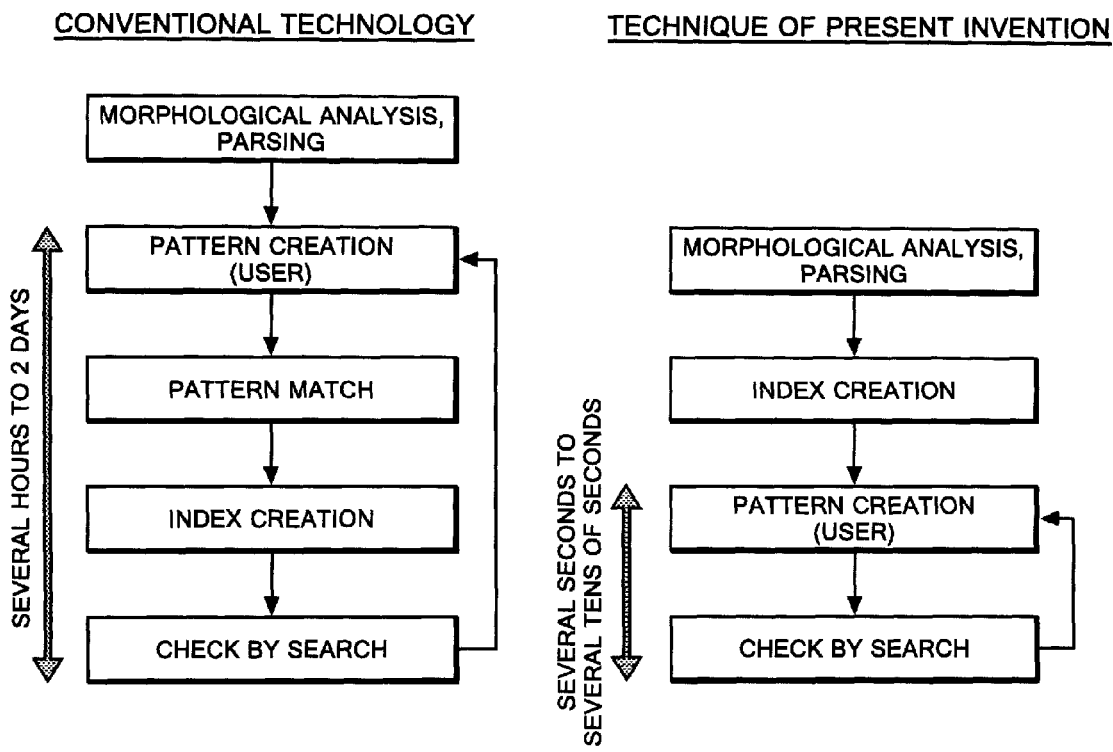
FIG. 21 shows comparison of processing related to pattern creation and search processing between a conventional technology and the present invention.

The technique of the present invention can be used as a pattern search tool using the result up to the search part 2. Specifically, it takes 1 second or less on average for a personal computer having Intel Core™ 2 DUO of 1.4 GHz clock rate to obtain a search result after pattern creation in searching through 100,000 pieces of data having a size of 3.6 GB by use of indices. It takes about several seconds to several tens of seconds to perform top N calculation for a modifier and a modifiee of a search candidate. FIG. 21 shows a difference in an editing cycle.

In the conventional technique, it is impossible to know what kind of pattern exists unless the entire text data is checked.

In the technique of the present invention, a high-frequency pattern can be preferentially found by a top N function.

In the conventional technique, there is no clue to finding an unknown pattern in searching for a pattern useful for services.

In the technique of the present invention, topics can be heuristically found from around a word of interest by the top N function. An example thereof will be described below. Because a human can take part in an extension of a pattern, it is possible to perform pattern creation while making determination of whether or not the pattern is a self-evident pattern.

Moreover, in the technique of the present invention, by checking a top N of a modifiee such as a product name, a service name and a part name, expressions frequently used to describe a target of interest, such as "kowareru (break)", "tsumaranai (boring)", "wakaranai (not know) [wakaru (know)+nai (not)]" and "ugokanai (not move) [ugoku (move)+nai (not)]", can be found with high accuracy (in terms of checking not co-occurrence but dependency).

Moreover, for a phrase expressing a phenomenon such as "CD-ROM wo ninshiki shinai (not recognize CD-ROM) [CD-ROM+ninshiki suru (recognize)+nai (not)]", a modifier of a term "ninshiki suru (recognize)" is checked and a word modifying through "tara", "kara", and "ato (later)", for example, is checked. Thus, causes of phenomena such as "Windows 95 wo dounyu shita (installed Windows 95)", "FORMAT wo shita (formatted)" and "HDD wo zousetsu shita (added an HDD)" can be found.

Next, with reference to FIGS. 22 and 23, an actual example of specific search processing will be described.

Figure 22:
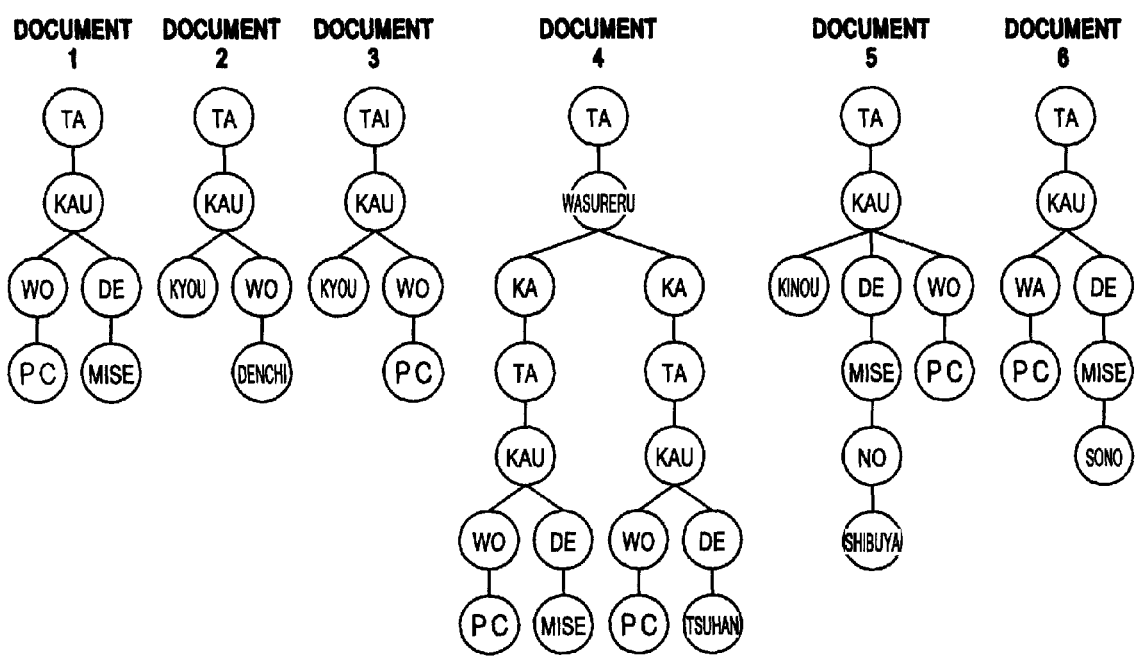
FIG. 22 shows examples of structural trees of text data.

FIG. 22 shows an example of having the following six documents, in other words, text sentences. Note that, although many more documents are actually handled, description is given by using a small number of documents for convenience of explanation.

Document 1: mise de PC wo katta (I bought a PC at a store.)
Document 2: kyou denchi wo katta (I bought a battery today.)
Document 3: kyou PC wo kaitai (I want to buy a PC today.)
Document 4: PC wo o mise de katta ka, PC wo tsuhan de katta ka wasure ta (I forgot if I bought a PC at a store or I bought a PC by mail order.)
Document 5: kinou Shibuya no mise de PC wo katta (Yesterday, I bought a PC at a store in Shibuya.)
Document 6: PC wa sono mise de katta (I bought the PC at the store.)

FIG. 22 shows syntax trees of the respective documents. Note that, in FIG. 22, punctuation marks and roots are omitted for convenience.

Figure 23:
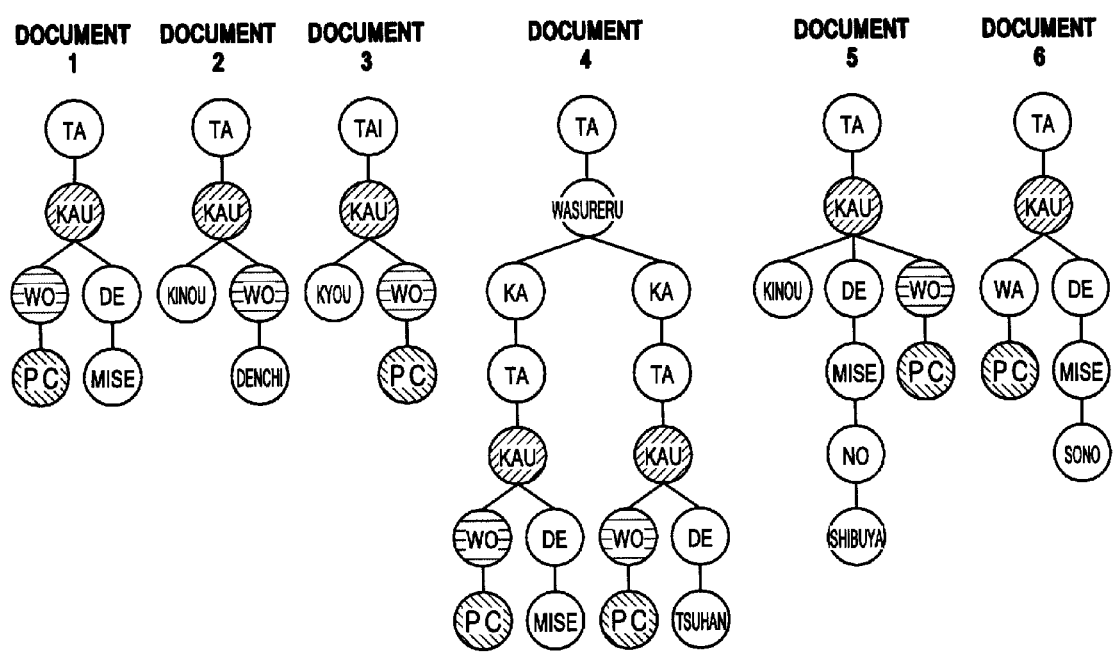
FIG. 23 is a view for explaining internal states in indices of the structural trees of the text data.

FIG. 23 shows creation of indices in the node array file 404 from the documents shown in FIG. 22. Here, attention is focused, particularly, on "kau (buy)", "wo" and "PC", and those nodes are highlighted in FIG. 23. Of course, entries in the node array file 404 are created for the other words. However, description thereof is omitted for convenience.

Specifically, occurrence information (document ID, preorder, postorder and depth) of "kau (buy)"=(1,2,5,2) (2,2,4,2) (3,2,4,2) (4,5,5,5) (4,12,12,5) (5,2,8,2) (6,2,6,2)

Occurrence information of "wo": (1,3,2,3,) (2,4,3,3) (3,4,3,3) (4,6,2,6) (4,13,9,6) (5,8,6,4)

Occurrence information of "PC": (1,4,1,4) (3,5,2,4) (4,7,1,7) (4,14,8,7) (5,9,6,4) (6,4,1,4)

This processing is executed by the index creation part 204 shown in FIG. 2 using the flowcharts shown in FIGS. 5 and 6.

Figure 24:
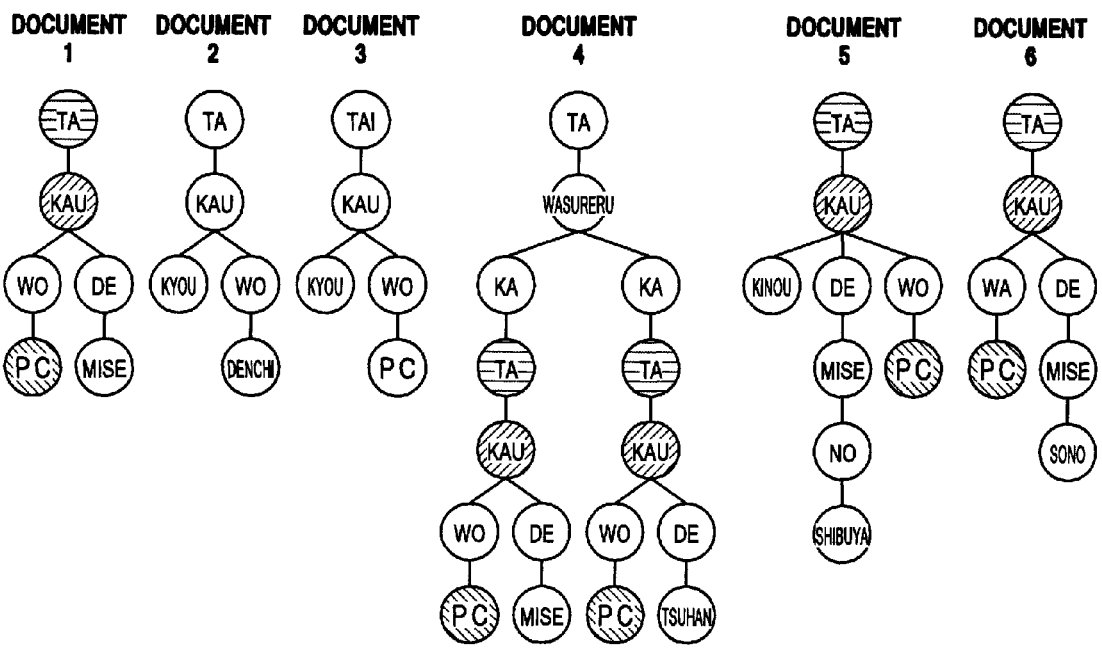
FIG. 24 is a view for schematically explaining a query and the search part for the structural trees of the text data.

Next, with reference to FIG. 24, actual search processing will be described. In FIG. 24, search is done by use of a search pattern "PC katta (I bought a PC)." As one method for inputting this search pattern, "PC", "kau (buy)" and "ta" are individually inputted. In response to the input, a system generates a structural tree sequentially connecting those nodes.

As another method, a sentence "PC katta (I bought a PC)" is inputted and a structural tree for search is generated by parsing on the computer system side. In the above cases, a pivot is specified by clicking on a node in the generated structural tree.

Alternatively, an interface of an automated answering system, for example, is also conceivable, which generates a query from a sentence such as "Kinou _ to iu PC wo katta (Yesterday, I bought a PC called _)" and calculates a top N of the portion "_" by use of a frequency on a corpus.

The search part 1 and the search part 2 are intended to obtain a highlighted node described below as a spot where the document matches the search pattern described above and to acquire occurrence information on the node "kau (buy)" in the pivot at the spot.

Referring back to FIG. 24, nodes in the document corresponding to "PC", "kau (buy)" and "ta", which are hit by the search, are highlighted as in the case of the search pattern example. Note that, in this event, although documents 2 and 3 also include the node "kau (buy)", none of the nodes are highlighted in documents 2 and 3 because both of the documents include neither "PC" nor "ta".

Figure 25:
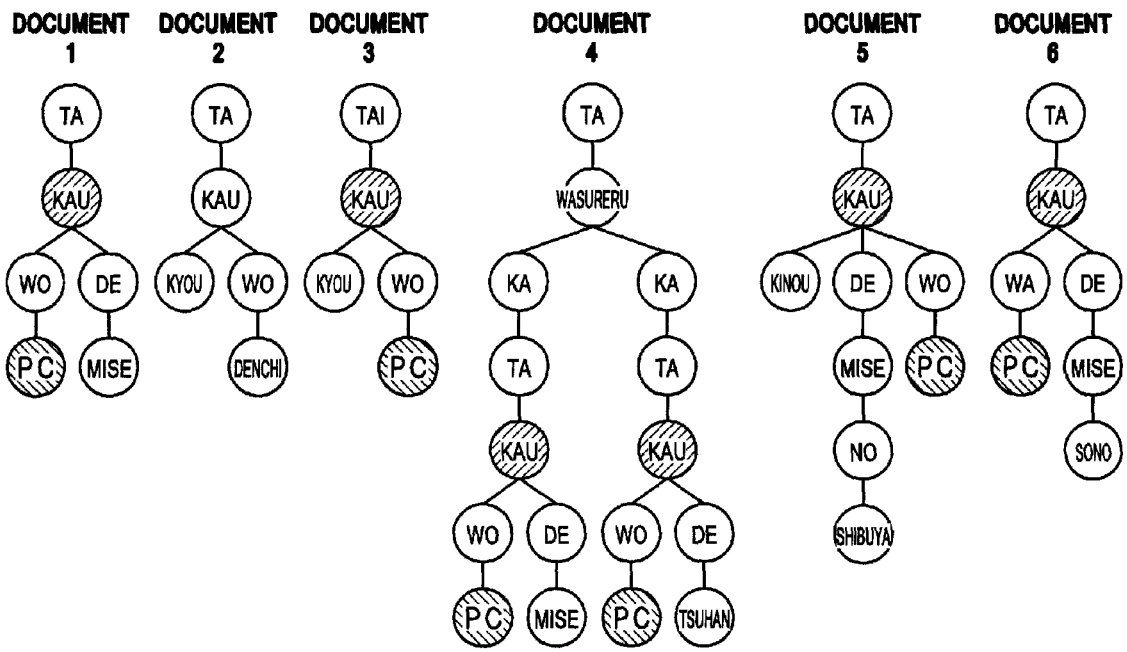
FIG. 25 is a view for explaining processing for the structural trees of the text data by the search part 1.

With reference to FIG. 25, the search part 1 searches for nodes other than n. When the processing by the search part 1 is completed, occurrence information other than π is discarded. Thus, not only the node "PC" that is the node other than n but also a parent node thereof "kau (buy)" is searched. Moreover, only occurrence information on the node "kau (buy)" at an occurrence spot where the node "kau (buy)" is higher than the node "PC" is stored.

Figure 26:
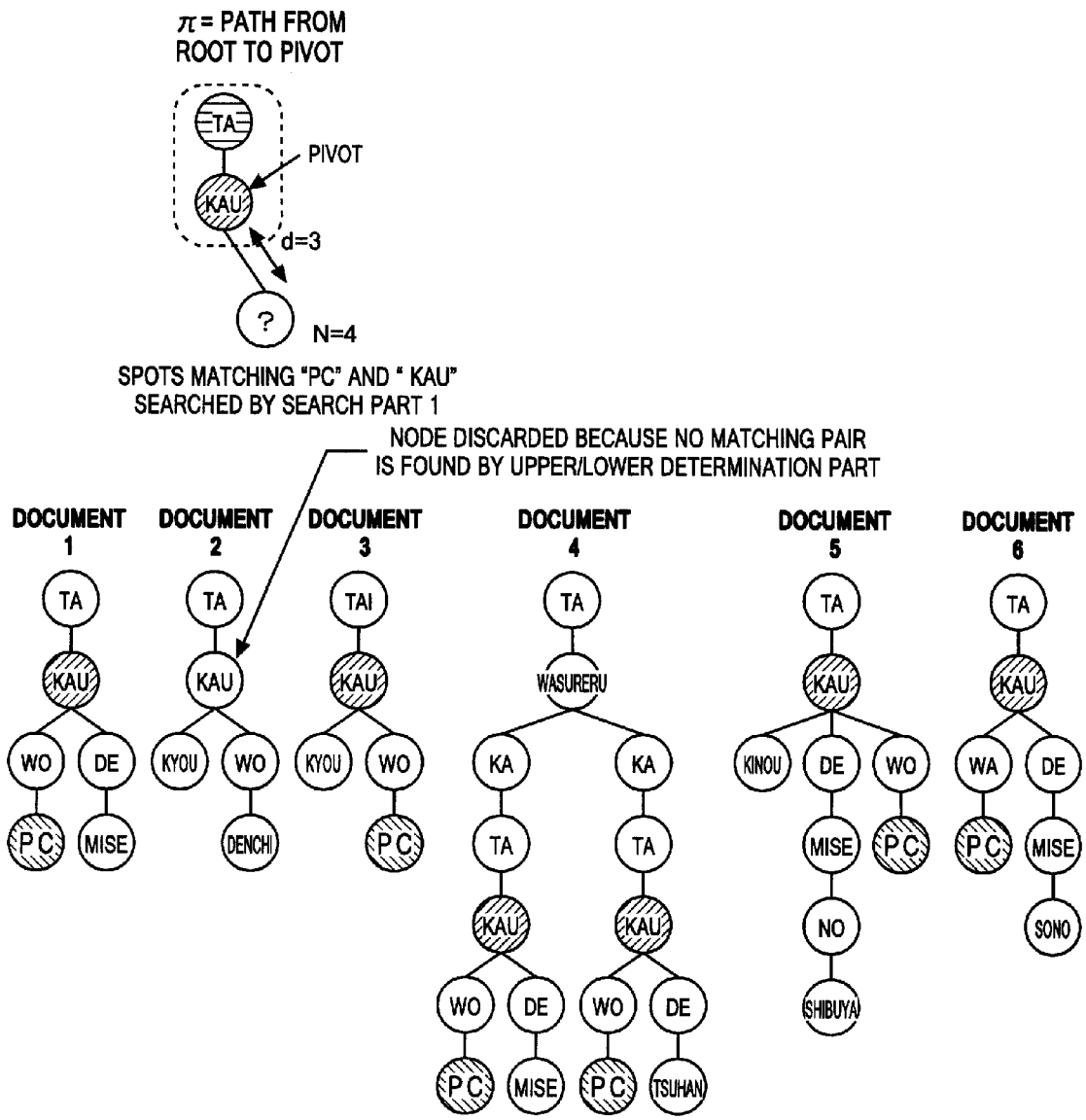
FIG. 26 is a view for explaining internal states when the processing for the structural trees of the text data by the search part 1 is finished.

FIG. 26 shows the time when the processing by the search part 1 is finished. When called up by the search part 1, the index reading part 208 loads the occurrence information of "kau (buy)": (1,2,5,2) (2,2,4,2) (3,2,4,2) (4,5,5,5) (4,12,12,5) (5,2,8,2) (6,2,6,2) and the occurrence information of "PC": (1,4,1,4) (3,5,2,4) (4,7,1,7) (4,14,8,7) (5,9,6,4) (6,4,1,4) into the memory 106.

The upper/lower determination part 1310 finds a pair between the occurrence information of "kau (buy)" and the occurrence information of "PC". As a result, (1,2,5,2) of "kau (buy)" matches (1,4,1,4) of "PC", (3,2,4,2) of "kau (buy)" matches (3,5,2,4) of "PC", (4,5,5,5) of "kau (buy)" matches (4,7,1,7) of "PC", (4,12,12,5) of "kau (buy)" matches (4,14,8,7) of "PC", (5,2,8,2) of "kau (buy)" matches (5,9,6,4) of "PC", and (6,2,6,2) of "kau (buy)" matches (6,4,1,4) of "PC". However, (2,2,4,2) of "kau (buy)" has no match found and thus is discarded. This corresponds to "kau (buy)" in document 2.

Figure 27:
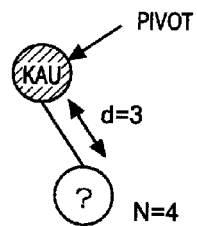
FIG. 27 shows internal states in processing for the structural trees of the text data by the search part 2.
Figure 27:
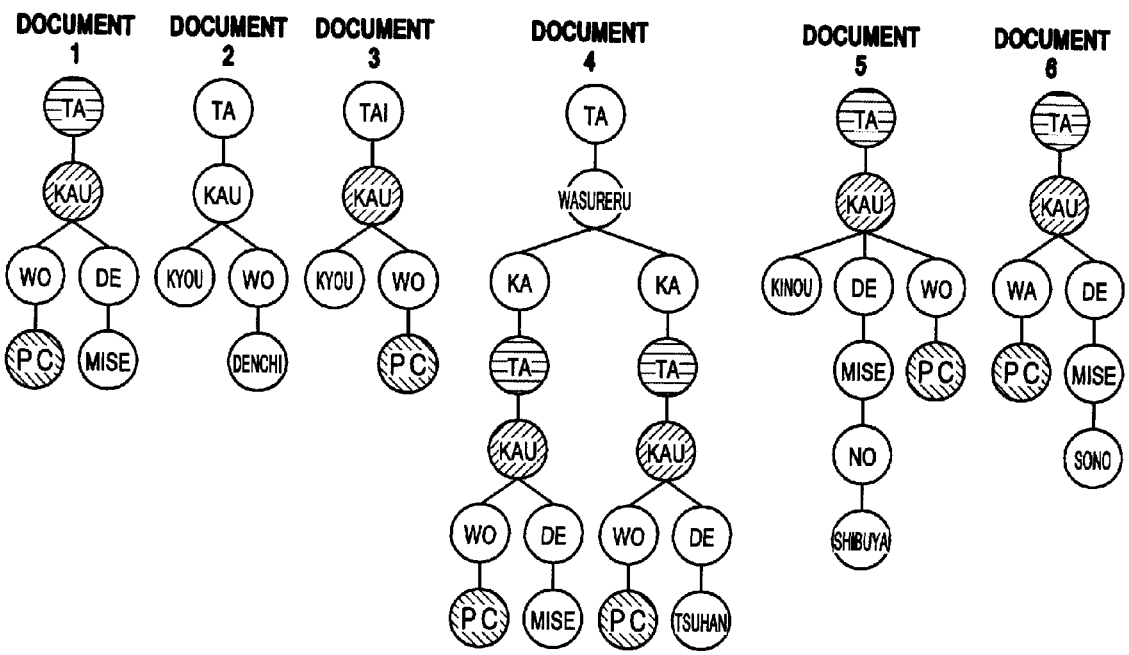

The search part 2 searches the occurrence information of all the nodes in the search pattern in descending order, and calculates occurrence information of the node "kau (buy)" only in a pattern matching the search pattern. At the stage of the search part 1, document 3 also matches the search pattern at "PC" and "kau (buy)". However, as shown in FIG. 27, at the stage of the search part 2, the occurrence information in document 3 is discarded because there is no node "ta" above the node "kau (buy)".

Figure 28:
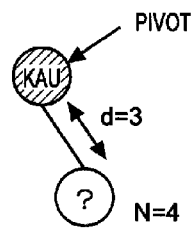
FIG. 28 shows processing for the structural trees of the text data by the top N calculation part.
Figure 28:
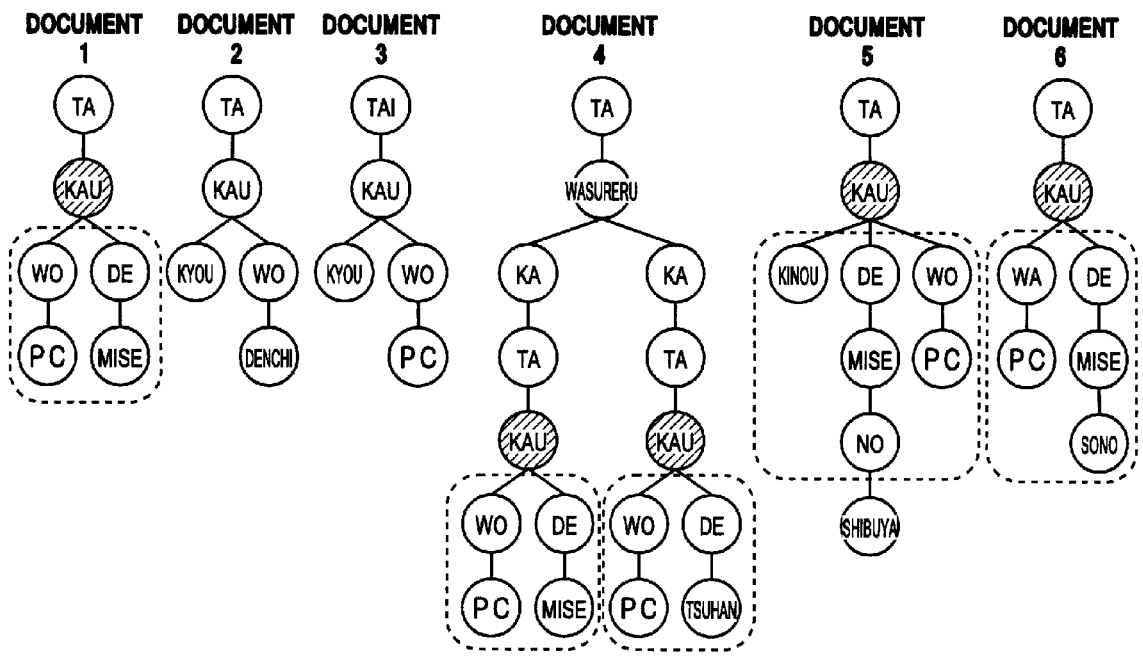

FIG. 28 shows processing by the top N calculation part 1308. The occurrence information in the node array file 404 is read in the order of the word appearing in more documents. In this case, the order of the word appearing in more documents is as follows.

"kau (buy)" 6
"wo", "PC", "ta" 5
"de", "mise (store)" 4
"kyou (today)" 2
"denchi (battery)", "tsuhan (mail order)", "ka", "no", "kinou (yesterday)", "Shibuya", "sono (the)", "ha" 1

Here, as shown in FIG. 28, the node "kau (buy)" is highlighted. Thus, the node having a depth difference of not more than d, which is below the node "kau (buy)", is checked by the upper/lower determination part 1310. Here, as shown in FIG.

28, assuming that d=3, "kau (buy)": 0, "wo": 3, "PC": 4, "ta": 0, "de": 4 and "mise (store)": 4 are calculated as indicated by the portions surrounded by dotted lines in FIG. 28.

At this point, a temporary top N is "PC": 4, "de": 4, "mise (store)": 4 and "wo": 3. However, since an unread most frequent word "kyou (today)" appears in two documents and the number of documents in which "kyou (today)" appears is smaller than the number of documents in which the temporarily least frequent word "wo" appears, the processing is finished here.

Although the above description was given of the example of Japanese, those skilled in the art in the field will understand that the present invention is applicable to search of documents described in an arbitrary language other than Japanese, because English, other Indo-European, Korean, Chinese, Turkish, Arabic and the like can also be sorted into structural trees by an appropriate parsing system.

The present invention implements a technique for searching at high speed for documents matching a dependency pattern from a large volume of text documents by providing a mechanism to quickly find top-N most frequent expanded patterns that consists of a dynamically given pattern and one additional word. The N words that are the additional words in the expanded patterns are obtained in a frequency order of expanded pattern.

Although the preferred embodiment of the present invention has been described in detail, it should be understood that various changes, substitutions and alternations can be made therein without departing from spirit and scope of the inventions as defined by the appended claims.

What is claimed is:

1. An information search system for searching through a database having a plurality of document data each having a unique document ID added thereto, by use of a computer, the system comprising:
    a storage device for storing the plurality of document data;
    index storage means for storing in the storage device occurrence information for each word in each of the plurality of document data when each of the document data is parsed and is expressed in a form of a parse tree with a root node for bundling a plurality of sentences, the occurrence information including a document ID of the document data containing the word, a first order that indicates a sequence number of the word originating from a root node in a structural tree, and a second order that indicates a reverse sequence number of the word originating from a terminal node to the root node in the structural tree, wherein the first order sequence number decreases in value as position proximity of the word to the root node increases, and wherein the second order reverse sequence number decreases in value as position proximity of the word to the terminal node increases;
    receiving means for receiving information on at least two words to be searched for;
    reading means for reading from the index storage means the occurrence information on each of the words received; and
    searching means for comparing occurrence information on a first word among the words received with occurrence information on a second word among the words received and for searching out a document ID of one of the two occurrence information which has the same document ID as the other occurrence information, the first order smaller than the other occurrence information, and the second order larger than the other occurrence information.

2. The information search system according to claim 1, wherein the occurrence information is sorted and listed in descending order of document frequency for each word ID.

3. The information search system according to claim 1, wherein:
    the occurrence information further comprises information on a depth from the root node; and
    the searching means returns the document ID of the occurrence information only when a difference in depth between the compared two kinds of occurrence information is not more than a predetermined value.

4. The information search system according to claim 3, further comprising:
    specification means for specifying at least one word as a base node; and
    means for reading the occurrence information on the word of the base node from the index storage means and for listing words having occurrence information which has the same document ID as a larger first order than, a smaller second order than and a depth difference not more than the predetermined value from the occurrence information on the word of the base node.

5. The information search system according to claim 4, wherein the words are listed in order of frequency of the occurrence information on the word.

6. An information search method for searching through a database having a plurality of document data each having a unique document ID added thereto, by use of a computer having a storage device, the method comprising the steps of:
    storing each of the plurality of document data in the storage device in a form of a structural tree starting from a root node by parsing;
    storing in the storage device occurrence information for each word in each of the plurality of document data when each of the document data is a parse tree with the root node for bundling a plurality of sentences, the occurrence information containing a document ID of the document data including the word, a first order that indicates a sequence number of the word originating from a root node in a structural tree, and a second order that indicates a reverse sequence number of the word originating from a terminal node to the root node in the structural tree, wherein the first order sequence number decreases in value as position proximity of the word to the root node increases, and wherein the second order reverse sequence number decreases in value as position proximity of the word to the terminal node increases;
    receiving information on at least two words to be searched for;
    reading from the storage device the occurrence information on each of the words received;
    comparing occurrence information on a first word among the received words with occurrence information on a second word among the received words; and
    searching out a document ID of one of the above two kinds of occurrence information which has the same document ID as the other occurrence information, the first order smaller than the other occurrence information, and the second order larger than the other occurrence information.

7. The information search method according to claim 6, wherein the occurrence information is sorted and listed in descending order of document frequency for each word ID.

8. The information search method according to claim 6, wherein:
    the occurrence information further comprises information on a depth from the root node; and in the searching step, the document ID of the occurrence information is returned only when a difference in depth between the compared two kinds of occurrence information is not more than a predetermined value.

9. The information search method according to claim 8, further comprising the steps of:
specifying at least one word as a base node; and
reading the occurrence information on the word of the base node from the storage device and listing words having occurrence information which has the same document ID as, a larger first order than, a smaller second order than and a depth difference not more than the predetermined value from, the occurrence information on the word of the base node.

10. The information search method according to claim 9, wherein the words are listed in order of frequency of the occurrence information on the word.

11. A computer readable storage medium tangibly embodying a computer readable program code having computer readable non-transitory instructions which, when implemented, cause a computer to carry out the steps of a method for searching through a database having a plurality of document data each having a unique document ID, the method comprising:
storing each of the plurality of document data in a form of a structural tree starting from a root node by parsing;
storing occurrence information for each word in each of the plurality of document data when each of the document data is a parse tree with the root node for bundling a plurality of sentences, the occurrence information containing a document ID of the document data including the word, a first order that indicates a sequence number of the word originating from a root node in a structural tree, and a second order that indicates a reverse sequence number of the word originating from a terminal node to the root node in the structural tree,
wherein the first order sequence number decreases in value as position proximity of the word to the root node increases, and
wherein the second order reverse sequence number decreases in value as position proximity of the word to the terminal node increases;
receiving information on at least two words to be searched for;
reading the occurrence information on each of the words received;
comparing occurrence information on a first word among the received words with occurrence information on a second word among the received words; and
searching out a document ID of one of the above two kinds of occurrence information which has the same document ID as the other occurrence information, the first order smaller than the other occurrence information, and the second order larger than the other occurrence information.

12. The computer readable storage medium according to claim 11, wherein the occurrence information is sorted and listed in descending order of document frequency for each word ID.

13. The computer readable storage medium according to claim 11, wherein:
the occurrence information further comprises information on a depth from the root node; and
in the searching step, the document ID of the occurrence information is returned only when a difference in depth between the compared two kinds of occurrence information is not more than a predetermined value.

14. The computer readable storage medium according to claim 13, wherein the method further comprises the steps of:
specifying at least one word as a base node; and
reading the occurrence information on the word of the base node and listing words having occurrence information which has the same document ID as a larger first order than, a smaller second order than and a depth difference not more than the predetermined value from the occurrence information on the word of the base node.

15. The computer readable storage medium according to claim 14, wherein the words are listed in order of frequency of the occurrence information on the word.

* * * * *